US011810167B2

(12) United States Patent
Caldwell

(10) Patent No.: US 11,810,167 B2
(45) Date of Patent: Nov. 7, 2023

(54) ITEM LEVEL DATA AGGREGATION

(71) Applicant: MX Technologies, Inc., Lehi, UT (US)

(72) Inventor: John Ryan Caldwell, Lehi, UT (US)

(73) Assignee: MX Technologies, Inc., Lehi, UT (US)

( * ) Notice: Subject to any disclaimer, the term of this patent is extended or adjusted under 35 U.S.C. 154(b) by 145 days.

(21) Appl. No.: 17/390,963

(22) Filed: Jul. 31, 2021

(65) Prior Publication Data

US 2021/0357996 A1 Nov. 18, 2021

Related U.S. Application Data

(63) Continuation of application No. 16/777,640, filed on Jan. 30, 2020, now Pat. No. 11,138,643.

(51) Int. Cl.
*G06Q 30/06* (2023.01)
*G06F 21/31* (2013.01)

(52) U.S. Cl.
CPC ............. *G06Q 30/06* (2013.01); *G06F 21/31* (2013.01)

(58) Field of Classification Search
CPC ...................................................... G06Q 30/06
See application file for complete search history.

(56) References Cited

U.S. PATENT DOCUMENTS

| | | | |
|---|---|---|---|
| 8,060,916 B2 | 11/2011 | Bajaj et al. | |
| 8,438,382 B2 | 5/2013 | Ferg et al. | |
| 8,732,479 B1 | 5/2014 | Henriksen et al. | |
| 8,768,838 B1 | 7/2014 | Hoffman | |
| 8,819,444 B2 | 8/2014 | Shahbazi et al. | |
| 8,826,395 B2 | 9/2014 | Bretschneider et al. | |
| 9,325,696 B1 | 4/2016 | Balfanz et al. | |
| 10,134,033 B2 * | 11/2018 | Yuan | G06Q 20/02 |
| 11,138,643 B2 | 10/2021 | Caldwell | |
| 2003/0065590 A1 | 4/2003 | Haeberli | |
| 2005/0144066 A1 | 6/2005 | Cope et al. | |
| 2008/0073429 A1 | 5/2008 | Oesterling et al. | |
| 2008/0228867 A1 | 9/2008 | Murphy et al. | |

(Continued)

FOREIGN PATENT DOCUMENTS

WO WO-0201462 A2 * 1/2002 ............. G06Q 30/06

OTHER PUBLICATIONS

Hart, Jonathan et al., "Website Credential Storage and Two-Factor Web Authentication with a JAVA SIM", Information Security Group, Card Centre Royal Holloway, University of London, Surrey, United Kingdom, pp. 229-236. (Year: 2010).

*Primary Examiner* — Scott C Anderson
(74) *Attorney, Agent, or Firm* — Kunzler Bean & Adamsor

(57) ABSTRACT

Apparatuses, systems, methods, and computer program products are disclosed for item level data aggregation. A method includes identifying a transaction made with a third party within a set of transactions. A method includes using electronic credentials for a user to login to an account of the user at a third party. A method includes downloading item-level data from a third party that corresponds to an identified transaction in response to logging into a user's account at a third party. Item-level data identifies one or more items within an identified transaction. A method includes displaying a set of transactions to a user. A method includes displaying item-level data for one or more items within an identified transaction to a user in response to receiving input from the user relative to the identified transaction in a displayed set of transactions.

20 Claims, 11 Drawing Sheets

(56) References Cited

U.S. PATENT DOCUMENTS

| | | | |
|---|---|---|---|
| 2009/0064311 A1 | 3/2009 | Clark et al. | |
| 2009/0271297 A1* | 10/2009 | McCracken | H04M 15/44 |
| | | | 705/28 |
| 2010/0185504 A1 | 7/2010 | Rajan et al. | |
| 2011/0047606 A1 | 2/2011 | Blomquist et al. | |
| 2012/0221467 A1 | 8/2012 | Hamzeh et al. | |
| 2012/0329388 A1 | 12/2012 | Royston et al. | |
| 2013/0304576 A1 | 11/2013 | Berland et al. | |
| 2013/0339116 A1* | 12/2013 | Schwarzkopf | G06Q 20/384 |
| | | | 705/14.27 |
| 2014/0058815 A1 | 2/2014 | Hiremath et al. | |
| 2015/0149272 A1* | 5/2015 | Salmon | G07F 17/0035 |
| | | | 705/14.33 |
| 2015/0332415 A1* | 11/2015 | Johansen | G06Q 30/04 |
| | | | 705/30 |
| 2016/0162882 A1* | 6/2016 | McClung, III | G06Q 20/352 |
| | | | 705/41 |
| 2016/0232194 A1 | 8/2016 | Abraham et al. | |

\* cited by examiner

600

602 2/28/2017 AMAZON.COM/BILL WA 025762 $47.32
604 2/27/2017 CHEVRON 0301646 OGDEN UT 025515 $53.99

606 2/24/2017 NETFLIX.COM CA 022103 $12.81

610

Your Orders

612

ORDER PLACED    TOTAL                   ORDER # 114-1192539-0005862
February 28, 2017    $47.32                 Order Details | Invoice

614

Chef's Classic Stainless 14-Inch Open Skillet
Sold by: Amazon.com LLC
Return eligible through Mar 11, 2017
$25.33

616

Steam Iron 1400-Watt Auto-Off, Purple
Sold by: ABC Inc.
Return eligible through Mar 12, 2017
$21.99

620

| 622 | + 2/28/2017 | Amazon.com Order | $47.32 |
| --- | --- | --- | --- |
| | + 2/27/2017 | Chevron Purchase | $53.99 |
| | . . . | | |
| | + 2/24/2017 | Netflix.com Payment | $12.81 |

630

| 622 | − 2/28/2017 | Amazon.com Order | $47.32 |
| --- | --- | --- | --- |
| 614 |  | Chef's Classic Stainless 14-Inch Open Skillet<br>Sold by: Amazon.com LLC<br>Return eligible through Mar 11, 2017<br>$25.33 | |
| 616 |  | Steam Iron 1400-Watt Auto-Off, Purple<br>Sold by: ABC Inc.<br>Return eligible through Mar 12, 2017<br>$21.99 | |
| | + 2/27/2017 | Chevron Purchase | $53.99 |
| | . . . | | |
| | + 2/24/2017 | Netflix.com Payment | $12.81 |

ITEM LEVEL DATA AGGREGATION

CROSS-REFERENCES TO RELATED APPLICATIONS

This application is a continuation of U.S. patent application Ser. No. 16/777,640 entitled "ITEM LEVEL AGGREGATION" and filed on Jan. 30, 2020 for John Ryan Caldwell, which is a continuation of U.S. patent application Ser. No. 15/447,106 entitled "ITEM LEVEL DATA AGGREGATION" and filed on Mar. 1, 2017 for John Ryan Caldwell, which claims the benefit of U.S. Provisional Patent Application No. 62/302,049 entitled "ITEM LEVEL DATA AGGREGATION" and filed on Mar. 1, 2016 for John Ryan Caldwell, which is incorporated herein by reference in its entirety for all purposes.

FIELD

This invention relates to data aggregation and more particularly relates to aggregating data at an item level.

BACKGROUND

As more and more of a user's data moves to the cloud, and more and more events or transactions become electronic, it has become increasingly difficult for a user to manage and/or track the user's own personal data. Users may therefore lose access to the data as services fail or data expires, or may not be able to access related data stored by different service providers.

SUMMARY

Methods are presented for item level data aggregation. In one embodiment, a method includes identifying a transaction made with a third party within a set of transactions. A method, in a further embodiment, includes using electronic credentials for a user to login to an account of the user at a third party. In certain embodiments, a method includes downloading item-level data from a third party that corresponds to an identified transaction in response to logging into a user's account at a third party. Item-level data identifies one or more items within an identified transaction. In a further embodiment, a method includes displaying a set of transactions to a user. A method, in certain embodiments, includes displaying item-level data for one or more items within an identified transaction to a user in response to receiving input from the user relative to the identified transaction in a displayed set of transactions.

Apparatuses are presented for item level data aggregation. An apparatus, in one embodiment, includes a trusted hardware device authorized by a user to use a plurality of electronic credentials for the user. A trusted hardware device, in some embodiments, is configured to identify a transaction made with a third party within a set of transactions. In a further embodiment, a trusted hardware device is configured to use electronic credentials for a user to login to an account of the user at a third party. A trusted hardware device, in certain embodiments, is configured to download item-level data from a third party that corresponds to an identified transaction in response to logging into a user's account at the third party. Item-level data identifies one or more items within an identified transaction. In one embodiment, a trusted hardware device is configured to display aa set of transactions to a user. A trusted hardware device, in a further embodiment, is configured to display item-level data for one or more items within an identified transaction to a user in response to receiving input from the user relative to the identified transaction in the displayed set of transactions.

Systems are presented for item level data aggregation. In one embodiment, a system includes a backend hardware server. A backend hardware server, in certain embodiments, identifies a transaction made with a third party within a set of transactions. In a further embodiment, a backend hardware server uses electronic credentials for a user to login to an account of the user at a third party. A backend hardware server, in one embodiment, downloads item-level data from the third party that corresponds to the identified transaction in response to logging into the user's account at the third party. In some embodiments, a backend hardware server downloads item-level data for a plurality of transactions of a user from a hardware server of a third party. Item-level data identifies one or more items within an identified transaction.

A system, in a further embodiment, includes an aggregation module located on a hardware device for a user. An aggregation module, in certain embodiments, comprises one or more of logic hardware and a non-transitory computer readable storage medium storing computer executable code. In one embodiment, an aggregation module is configured to display a set of transactions to the user. An aggregation module, in some embodiments, is configured to display the item-level data for one or more items within an identified transaction to a user in response to receiving input from the user relative to the identified transaction in a displayed set of transactions.

An apparatus, in another embodiment, includes means for performing the various steps and operations described with regard to the disclosed methods, apparatuses, and systems. Computer program products comprising a computer readable storage medium are presented. In certain embodiments, a computer readable storage medium stores computer usable program code executable to perform one or more of the operations described with regard to the disclosed methods, apparatuses, and systems.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
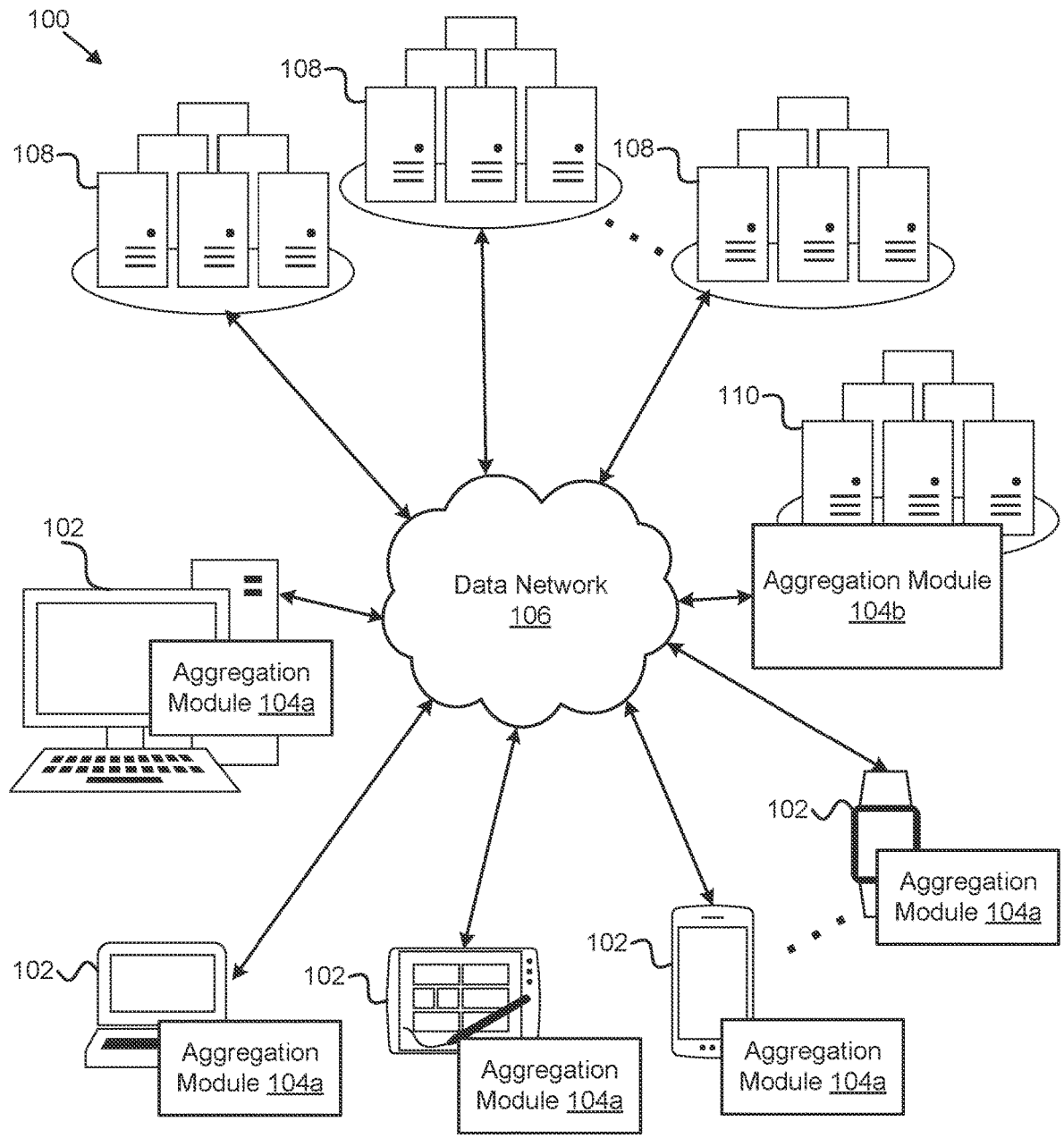
FIG. 1 is a schematic block diagram illustrating one embodiment of a system for item level data aggregation.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for item level data aggregation. In one embodiment, the system 100 includes one or more hardware devices 102, one or more aggregation modules 104 (e.g., a backend aggregation module 104b and/or a plurality of aggregation modules 104a disposed on the one or more hardware devices 102), one or more data networks 106 or other communication channels, one or more third party service providers 108 (e.g., one or more servers 108 of one or more service providers 108; one or more cloud or network service providers 108, or the like), and/or one or more backend hardware servers 110. In certain embodiments, even though a specific number of hardware devices 102, aggregation modules 104, data networks 106, third party service providers 108, and/or backend hardware servers 110 are depicted in FIG. 1, one of skill in the art will recognize, in light of this disclosure, that any number of hardware devices 102, aggregation modules 104, data networks 106, third party service providers 108, and/or backend hardware servers 110 may be included in the system 100 for distributed data aggregation.

In one embodiment, the system 100 includes one or more hardware devices 102. The hardware devices 102 (e.g., computing devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the hardware devices 102 are in communication with one or more servers 108 of one or more third party service providers 108 and/or one or more backend hardware servers 110 via a data network 106, described below. The hardware devices 102, in a further embodiment, are capable of executing various programs, program code, applications, instructions, functions, or the like.

In one embodiment, an aggregation module 104 is configured to determine and/or receive a user's electronic credentials (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) for one or more third party service providers 108. The aggregation module 104, in certain embodiments, accesses a server 108 of a third party service provider 108 using a user's electronic credentials to download data associated with the user from the server 108, such as a user's purchase history, a user's photos, a user's social media posts, a user's medical records, a user's financial transaction records or other financial data, and/or other data associated with and/or owned by a user but stored by a server 108 of a third party service provider 108 (e.g., stored by hardware not owned, maintained, and/or controlled by the user). The aggregation module 104, in various embodiments, may provide the downloaded data to the user locally (e.g., displaying the data on an electronic display of a hardware device 102); may provide the downloaded data from the hardware device 102 of the user to a remote server 110 (e.g., a backend aggregation module 104b) which may be unaffiliated with the third party service provider 108; may provide one or more alerts, messages, advertisements, or other communications to the user (e.g., on a hardware device 102) based on the downloaded data; or the like.

In certain embodiments, the system 100 includes a plurality of aggregation modules 104 disposed/located on hardware devices 102 of a plurality of different users (e.g., comprising hardware of and/or executable code running on one or more hardware devices 102). The plurality of aggregation modules 104 may act as a distributed and/or decentralized system 100, executing across multiple hardware devices 102, which are geographically dispersed and using different IP addresses, each downloading and/or aggregating data (e.g., photos, social media posts, medical records, financial transaction records, other financial data, and/or other user data) separately, in a distributed and/or decentralized manner. While a third party service provider 108 (e.g., an ecommerce site or other online retailer or service provider; a financial institution, bank, credit union, and/or other online banking provider; a social media site; a medical provider; a photo hosting site; or the like) may block a data aggregation service or other entity from accessing data for a plurality of users from a single location (e.g., a single IP address, a single block of IP addresses, or the like), a distributed and/or decentralized swarm of many aggregation modules 104, in certain embodiments, may be much more difficult for a third party service provider 108 to block.

In one embodiment, a hardware device 102 may include and/or execute an internet browser, which a user may use to access a server 108 of a third party service provider 108 (e.g., by loading a webpage of the third party service provider 108 in the internet browser). At least a portion of an aggregation module 104, in certain embodiments, may comprise a plugin to and/or an extension of an internet browser of a user's personal hardware device 102, so that a third party service provider 108 may not block the aggregation module 104 from accessing the server 108 of the third party service provider 108 without also blocking the user's own access to the server 108 using the internet browser. For example, the aggregation module 104 may use the same cookies, IP address, saved credentials, or the like as a user would when accessing a server 108 of a third party service provider 108 through the internet browser. In certain embodiments, the aggregation module 104 may support integration with multiple different types of internet browsers (e.g., on different hardware devices 102).

An aggregation module 104, in certain embodiments, may mimic or copy a user's behavioral pattern in accessing a server 108 of a third party service provider 108, to reduce a likelihood that the third party service provider 108 may distinguish access to the server 108 by an aggregation module 104 from access to the server 108 by a user. For example, an aggregation module 104 may visit one or more locations (e.g., webpages) of a server 108 of a third party service provider 108, even if the aggregation module 104 does not intend to download data from each of the one or more locations, may wait for a certain delay time between accessing different locations, may use a certain scroll pattern, or the like, to mask the aggregation module 104's downloading and/or aggregating of a user's data, to reduce the chances of being detected and/or blocked by the third party service provider 108.

In one embodiment, at least a portion of an aggregation module 104 may be integrated with or otherwise part of another application executing on a hardware device 102, such as a personal financial management application (e.g., computer executable code for displaying a user's financial transactions from multiple financial institutions including item level purchase details within single transactions, determining and/or displaying a user's financial budgets and/or financial goals, determining and/or displaying a user's account balances, determining and/or displaying a user's net worth, or the like), a photo viewer, a medical application, an insurance application, an accounting application, a social media application, or the like, which may use data the aggregation module 104 downloads from a server 108 of a third party service provider 108.

In one embodiment, the aggregation modules 104a comprise a distributed system 100, with the aggregation modules 104a and/or the associated hardware devices 102 downloading and/or aggregating data substantially independently (e.g., downloading data concurrently or non-concurrently, without a global clock, with independent success and/or failure of components). Distributed aggregation modules 104a may pass messages to each other and/or to a backend aggregation module 104b, to coordinate their distributed aggregation of data for users. In one embodiment, the aggregation modules 104a are decentralized (e.g., hardware devices 102 associated with users perform one or more aggregation functions such as downloading data), rather than relying exclusively on a centralized server or other device to perform one or more aggregation functions.

In a distributed and/or decentralized system 100, a central entity, such as a backend aggregation module 104b and/or a backend hardware server 110, in certain embodiments, may still provide, to one or more aggregation modules 104a, one or more messages comprising instructions for accessing a server 108 of a third party service provider 108 using a user's credentials, or the like. For example, a backend aggregation module 104b may provide one or more aggregation modules 104a of one or more hardware devices 102 with one or more sets of instructions for accessing a server 108 of a third party service 108, such as a location for entering a user's electronic credentials (e.g., a text box, a field, a label, a coordinate, or the like), an instruction for submitting a user's electronic credentials (e.g., a button to press, a link to click, or the like), one or more locations of data associated with a user (e.g., a row in a table or chart, a column in a table or chart, a uniform resource locator (URL) or other address, a coordinate, a label, or the like), and/or other instructions or information, using which the aggregation modules 104a may access and download a user's data.

In a further embodiment, one or more aggregation modules 104a may pass messages to each other, such as instructions for accessing a server 108 of a third party service provider 108 using a user's credentials, or the like, in a peer-to-peer manner. In another embodiment, a central entity, such as a backend aggregation module 104b, may initially seed one or more sets of instructions for accessing a server 108 of a third party service provider 108 using a user's credentials to one or more aggregation modules 104a, and the one or more aggregation modules 104a may send the one or more sets of instructions to other aggregation modules 104a.

Instructions for accessing a user's data, however, in certain embodiments, may change over time, may vary for different users of a third party service provider 108, or the like (e.g., due to upgrades, different service levels or servers 108 for different users, acquisitions and/or consolidation of different third party service providers 108, or the like), causing certain instructions to fail over time and/or for certain users, preventing an aggregation module 104 from accessing and downloading a user's data. A backend aggregation module 104b, in one embodiment, may provide one or more aggregation modules 104a with a hierarchical list of multiple sets of instructions, known to have enabled access to a user's data from a server 108 of a third party service provider 108. An aggregation module 104a on a hardware device 102 may try different sets of instructions in hierarchical order, until the aggregation module 104a is able to access a user's data.

An aggregation module 104, in certain embodiments, may provide an interface to a user allowing the user to repair or fix failed instructions for accessing the user's data, by graphically identify an input location for the user's electronic credentials, an instruction for submitting a user's electronic credentials, a location of data associated with the user, or the like. An aggregation module 104, in one embodiment, may highlight or otherwise suggest (e.g., bold, color, depict a visual comment or label, or the like) an estimate which the aggregation module 104 has determined of an input location for the user's electronic credentials, an instruction for submitting a user's electronic credentials, a location of data associated with the user, or the like. For example, an aggregation module 104 may process a web page of a server 108 of a third party service provider 108 (e.g., parse and/or search a hypertext markup language (HTML) file) to estimate an input location for the user's electronic credentials, an instruction for submitting a user's electronic credentials, a location of data associated with the user, or the like.

An aggregation module 104, in certain embodiments, may provide an advanced interface for a user to graphically repair broken and/or failed instructions for accessing a user's data from a server 108 of a third party service provider 108, which allows a user to view code of a webpage (e.g., HTML or the like) and to identify an input location for the user's electronic credentials, an instruction for submitting a user's electronic credentials, a location of data associated with the user, or the like within the code of the webpage. In one embodiment, an aggregation module 104 may provide a basic interface for a user to graphically repair broken and/or failed instructions for accessing a user's data from a server 108 of a third party service provider 108 by overlaying a basic interface over a web page or other location of the server 108 wherein the user may graphically identify an input location for the user's electronic credentials, an instruction for submitting a user's electronic credentials, a location of data associated with the user, or the like (e.g., without requiring the user to view HTML, or other code of the web page). An aggregation module 104, in certain embodiments, may provide an interface that includes a selectable list of broken and/or missing instructions, locations, or the like, and may highlight and/or display suggestions graphically in response to a user selecting an item from the list.

An aggregation module 104, in one embodiment, may test instructions provided by users (e.g., using a test set) before allowing each of the aggregation modules 104a to use the provided instructions (e.g., to prevent an abusive user from providing false or incorrect instructions). An aggregation module 104 may score or rate users based on a success rate of the users' provided instructions, and may expedite (e.g., provide to a greater number of aggregation modules 104a and/or users) the use of instructions from users with a higher score or rating. The distributed network of aggregation modules 104, in certain embodiments, may thereby be self-healing and/or self-testing, allowing continued access to and/or aggregation of users' data from one or more third party service providers 108, even if access instructions change or become broken.

The one or more aggregation modules 104, in certain embodiments, may provide an interface (e.g., an application programming interface (API)) to provide downloaded and/or aggregated user data from servers 108 of one or more third party service providers 108 to one or more other entities (e.g., a remote server 110 unaffiliated with the third party service provider 108, a backend aggregation module 104b, or the like). The interface, in one embodiment, comprises a private interface between aggregation modules 104a of users' hardware devices 102 and one or more backend aggregation modules 104b. For example, this may enable a backend aggregation module 104b to provide a user with access to downloaded and/or aggregated user data at multiple locations, on multiple hardware devices 102, through multiple channels, or the like, even if the user's hardware device 102 which downloaded the data is turned off, out of battery, not connected to the data network 106, or the like. In another embodiment, the interface comprises a public and/or open interface, which may be secured, allowing a user to share the user's downloaded data from an aggregation module 104 to one or more other tools, services, and/or other entities to store, process, and/or otherwise use the data.

In various embodiments, an aggregation module 104 may be embodied as hardware, software, or some combination of hardware and software. In one embodiment, an aggregation module 104 may comprise executable program code stored on a non-transitory computer readable storage medium for execution on a processor of a hardware device 102, a backend hardware server 110, or the like. For example, an aggregation module 104 may be embodied as executable program code executing on one or more of a hardware device 102, a backend hardware server 110, a combination of one or more of the foregoing, or the like. In such an embodiment, the various modules that perform the operations of an aggregation module 104, as described below, may be located on a hardware device 102, a backend hardware server 110, a combination of the two, and/or the like.

In various embodiments, an aggregation module 104 may be embodied as a hardware appliance that can be installed or deployed on a backend hardware server 110, on a user's hardware device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), or elsewhere on the data network 106 and/or collocated with a user's hardware device 102. In certain embodiments, an aggregation module 104 may comprise a hardware device such as a secure hardware dongle or other hardware appliance device (e.g., a set-top box, a network appliance, or the like) that attaches to another hardware device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of an aggregation module 104 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to an aggregation module 104.

An aggregation module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, an aggregation module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of an aggregation module 104.

The semiconductor integrated circuit device or other hardware appliance of an aggregation module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of an aggregation module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more third party service providers 108, in one embodiment, may include one or more network accessible computing systems such as one or more web servers hosting one or more web sites, an enterprise intranet system, an application server, an application programming interface (API) server, an authentication server, or the like. The one or more third party service providers 108 may include systems related to various institutions or organizations. For example, a third party service provider 108 may include a system providing electronic access to an ecommerce site or other online retailer or service provider, a financial institution, a university, a government agency, a utility company, an email provider, a social media site, a photo sharing site, a video sharing site, a data storage site, a medical provider, or another entity that stores data associated with a user. A third party service provider 108 may allow users to create user accounts to upload, view, create, and/or modify data associated with the user. Accordingly, a third party service provider 108 may include an authorization system, such as a login element or page of a web site, application, or similar front-end, where a user can provide credentials, such as a username/password combination, to access the user's data.

In one embodiment, the one or more backend hardware servers 110 and/or one or more backend aggregation modules 104b provide central management of the networked swarm of aggregation modules 104a. For example, the one or more backend aggregation modules 104b and/or a backend hardware server 110 may store downloaded user data from the aggregation modules 104a centrally, may provide instructions for the aggregation modules 104a to access user data from one or more third party service providers 108 using user credentials, or the like. A backend hardware server 110 may include one or more servers located remotely from the hardware devices 102 and/or the one or more third party service providers 108. A backend hardware server 110 may include at least a portion of the modules or sub-modules described below with regard to the aggregation modules 104 of FIG. 2 and FIG. 3, may comprise hardware of an aggregation module 104, may store executable program code of an aggregation module 104 in one or more non-transitory computer readable storage media, and/or may otherwise perform one or more of the various operations of an aggregation module 104 described herein in order to aggregate user data from one or more third party service providers in a distributed manner.

In certain embodiments, a user 102 may provide electronic credentials to an aggregation module 104 in order for the aggregation module 104 to download and/or aggregate the user's data from an associated account with one or more third party service providers 108; in order for the aggregation module 104 to change, transfer, or switch periodic and/or recurring payments (e.g., bill pay, credit or debit card payments, automated clearing house (ACH) payments, or the like) made to a third party service provider 108 to a different payment provider (e.g., a different bank, credit union, or other financial institution; a different credit or debit card; a different bank account; or the like); and/or for another purpose.

The aggregation module 104, in one embodiment, downloads and/or aggregates item level data from one or more third party service providers 110. In certain embodiments, item level data comprises identification of one or more sub-items that form part of a larger item. For example, item level data may comprise identifiers for one or more individual items (e.g., goods and/or services) which a user purchased within a larger, single transaction. An item level identifier for one or more individual items may include one or more of the item's name, stock keeping unit (SKU) identifier, universal product code (UPC), international article number (EAN), global trade item number (GTIN), or the like.

Item level data, in certain embodiments, may not be available from certain third party service providers 108. For example, a financial institution 108 may provide the aggregation module 104 with a list of one or more transactions, including one or more of a date, an amount, a location or vendor, or the like for each transaction, but without any item level information for items within a transaction. In order to download and/or aggregate item level data, in one embodiment, the aggregation module 104 may use a user's electronic credentials to access a third party service provider 108 associated with an identified transaction, such as an online shopping website; an audio, video, and/or other digital media website; a loyalty and/or rewards website for a retail store; or the like, to access and download item level information for items within a transaction (e.g., by accessing the user's purchase history, transaction history, order history, account history, viewing or listening history, or the like).

For example, the aggregation module 104 may download item level data comprising movies and/or television shows purchased and/or viewed, eBooks purchased and/or read, or the like from a digital media provider's website, such as Apple® iTunes®, Google® Play®, Netflix®, Hulu®, Amazon®, or the like. The aggregation module 104 may download item level data comprising physical goods or other items purchased from an online retailer's website, such as Amazon® or the like. The aggregation module 104 may download item level data comprising menu items ordered from a restaurant's loyalty and/or rewards website; may download item level data for individual goods purchased from a grocery store, department store, hardware store, or the like's loyalty and/or rewards website, from a store credit card account website, or the like.

The aggregation module 104 may automatically click or select one or more individual items within a listed history, and download the resulting item level data for the item, returning to the listed history and repeating for each listed item or the like, using an access pattern and/or screen scrape as described in greater detail below. In certain embodiments, in response to determining that item level data for a transaction is not available from a third party service provider 108 and/or in response to a request from a user, the aggregation module 104 may use a camera of a hardware device 102, a scanner, or the like to photograph and/or scan a paper receipt from a third party service provider 108, and may use optical character recognition to determine item level data from the receipt, instead of and/or in addition to downloading item level data from one or more third party service providers 108.

In one embodiment, the aggregation module 104 may correlate downloaded and/or aggregated transaction data that does not have item level data (e.g., from a financial institution, from a financial transaction data aggregation server 104b, or the like) with item level data downloaded and/or aggregated from a particular third party service provider 108 with which the transaction occurred. For example, the aggregation module 104 may match a location and/or vendor identifier or portion thereof listed in transaction data, with the actual third party service provider 108 with which the transaction occurred, access item level data from the third party service provider 108, and match the transaction data to the item level data based on a transaction amount, a transaction date, a transaction location, a product image, a product link, a number of items, or the like. The aggregation module 104 may present the item level data to the user within a personal financial management interface, allowing the user to view a transaction history, with item level data for individual transactions, may categorize a transaction (e.g., for inclusion in a budget or the like) based on the item level data, may provide a recommendation and/or advertisement based on the item level data, and/or otherwise provide the item level data to the user.

In one embodiment, an aggregation module 104 is configured to switch, migrate, and/or transfer execution of one or more transactions between service providers 108. An aggregation module 104 may identify a transaction to migrate by processing aggregated data (e.g., an aggregated set of transactions) from one or more servers 108 (e.g., downloaded from one or more third party service providers 108, from one or more first party service providers 108 associated with the backend server 110, from one or more aggregation servers 108, and/or the like). An aggregation module 104 may identify one or more repeating transactions from a set of transactions, prompt a user to migrate one or more repeating transactions from one service provider 108 to a different service provider 108, and/or migrate one or more repeating transactions to a different service provider 108, or the like.

Many users may desire to switch service providers 108. However, service providers 108 may make the process difficult, or users may not want to go through the headache of making the switch, even if a different service provider 108 provides better features, quality, price, or another attribute than a current service provider 108. An aggregation module 104, in certain embodiments, identifies repeating transactions associated with a service provider 108, and provides an interface allowing a user to switch or migrate the transaction to a different service provider 108 (e.g., a different software as a service (SaaS) provider; a different data repository; a different social network; a different payment source such as a debit card, credit card, financial account, online payment system account, or the like; a different entity and/or institution; or the like).

An aggregation module 104 may comprise and/or be part of a trusted hardware device 102, 110, which is secure and authorized by a user to store and/or use one or more of the user's electronic credentials or other important data. An aggregation module 104 may be provided by a government entity, an educational institution, a financial institution, and/or another entity which the user trusts and/or authorizes to act in its behalf. For example, an aggregation module 104 may be provided by a service provider 108 associated with the backend server 110, allowing users to migrate and/or switch one or more transactions from other third party service providers 108 to the first party service provider 108 providing the aggregation module 104 (e.g., a social network 108's application or website may provide an aggregation module 104 as a browser plugin, a mobile application, installable software, or the like that prompts a user to migrate and/or switch a social media post to the social network, in response to identifying repeated posts to a different social network; a financial institution 108's mobile application and/or website may prompt a user to switch one or more repeating payments from a credit card, debit card, checking account, savings account, or other financial account of a competitor 108 to a credit card, debit card, checking account, savings account, or other financial account of the financial institution 108; an operating system for a hardware device 102 may comprise an aggregation module 104 that identifies repeating antivirus scans, data backups, or other events/transactions, and may prompt a user to migrate and/or switch the identified transactions from a third party service provider 108 to a service provider 108 associated with the operating system; or the like).

In this manner, one or more aggregation modules 104 may automate and/or simplify the migration of transactions from one service provider 108 to a different service provider 108, with minimal interaction with a user (e.g., accepting a prompt, providing and/or authorizing use of electronic credentials, or the like), rather than requiring a user to contact a service provider 108 to manually migrate or transfer execution of an event/transaction.

A transaction, as used herein, may comprise a detected and/or recorded electronic occurrence or the like associated with a user, a user's hardware device 102, a user's account, or the like. A transaction, in various embodiments, may occur on and/or may be detected and/or recorded by an aggregation module 104, a service provider 108, a backend server 110, a hardware device 102 of a user, one or more sensors, or the like. For example, in various embodiments, a transaction may comprise one or more of a data backup event for a hardware device 102 of a user over a data network 106 (e.g., to a service provider 108), an antivirus and/or security scan event for a hardware device 102 of a user (e.g., periodically scanning files and/or data storage of a hardware device 102 to locate one or more viruses, malware, bots, worms, rootkits, and/or other security risks using software and/or definitions provided by one or more service providers 108), a software and/or firmware update event for a hardware device 102 of a user (e.g., an operating system update, a software patch, an application update, and/or another update downloaded and/or installed from a service provider 108 over a data network 106), an electronic subscription event for a data network service (e.g., a renewal, a payment, or the like), an electronic transaction event (e.g., a credit or debit card payment, a direct deposit, an electronic bill payment, an automated clearing house (ACH) payment, an online and/or electronic money transfer, a mobile and/or wireless payment, or the like to a website, merchant, vendor, individual, and/or other entity), or the like.

A subscription event may include renewing a subscription, paying for a subscription, or the like. A data network service may comprise a digital and/or electronic service that may occur over and/or using a data network 106, such as a cloud software and/or software as a service (SaaS) subscription, a streaming and/or downloadable media subscription (e.g., video, audio, e-books, or the like), an internet service subscription, a cable television subscription, a subscription made over a data network 106 for delivery of digital and/or physical goods and/or services, or the like.

A repeating transaction may comprise an event that occurs more than once. Different occurrences of a repeating transaction, in certain embodiments, may comprise at least one attribute in common (e.g., and/or may have one or more attributes that are different). For example, different occurrences of a repeating transaction may be associated with the same service provider 108, website, and/or other entity; may occur on or around the same time, periodically (e.g., at or around the same time each day; on the same day and/or within a few days each week, month, quarter, year, or other time period; or the like); may be associated with the same or similar (e.g., within a predefined percentage or amount) transaction amount; and/or have one or more other similarities. An aggregation module 104 may be configured to select one or more repeating transactions having at least a threshold number of similarities, may only select one or more repeating transactions having one or more required similarities, or the like. In one embodiment, an aggregation module 104 may provide an interface (e.g., a graphical user interface (GUI), an application programming interface (API), a command line interface (CLI), and/or another interface) allowing a user (e.g., an end user on a hardware device 102, an administrator of a backend server 110, or the like) to select or otherwise define one or more rules for the aggregation module 104 to identify one or more repeating transactions, such as a rule defining a threshold number of similarities for a repeated transaction, a rule requiring one or more similarities for a repeated transaction, a rule allowing one or more differences for a repeated transaction, or the like.

In certain embodiments, a recurring transaction is a type of repeated transaction with one or more predefined similarities, such as a repeated transaction that occurs on or around the same time during each of a plurality of time periods (e.g., at or around the same time each day; on the same day and/or within a few days each week, month, quarter, year, or other time period; or the like) and/or is associated with the same or similar (e.g., within a predefined percentage or amount) transaction amount, or the like. In one embodiment, an aggregation module 104 may be configured to identify any repeating transaction (e.g., including recurring and non-recurring events/transactions). In a further embodiment, an aggregation module 104 may be configured to identify only recurring events/transactions.

An aggregation module 104, in one embodiment, may download, aggregate, and/or otherwise collect or receive a set of transactions (e.g., a log, a listing, a history, a file, a data structure, and/or another record of one or more transactions), in which the aggregation module 104 may identify one or more repeating transactions or the like for migrating and/or switching. For example, an aggregation module 104 may aggregate transactions comprising a user's posts to one or more social media networks 108, may aggregate system and/or application logs from one or more hardware devices 102, may aggregate transactions from one or more electronic calendar or scheduling services 108, may aggregate images from one or more image sharing and/or backup services 108, may aggregate financial transactions from one or more financial institutions 108, may aggregate online orders from one or more e-commerce services 108, and/or may aggregate a set of transactions from one or more servers 102, 108, 110.

An aggregation module 104, in certain embodiments, may aggregate a set of transactions from one type of service provider 108 in order to identify and migrate repeating transactions for another type of service provider 108. For example, an aggregation module 104 may aggregate financial transactions from one or more financial institution service providers 108 that have issued debit and/or credit cards to a user; where a user has a checking, savings, or other financial account; or the like in order to identify repeating transactions for one or more other types of service providers 108 (e.g., a SaaS provider, a software publisher, a subscription media provider, an e-commerce website, a merchant, a vendor, a mobile wallet provider, an antivirus provider, a utility company, an email provider, a social media site, a photo sharing site, a video sharing site, a data storage site, a medical provider, or the like). An aggregation module 104 may use a first set of electronic credentials of a user to aggregate a set of transactions (e.g., directly and/or indirectly from one or more financial institutions to aggregate financial transaction data comprising financial transaction events) and, in response to identifying a repeated transaction, prompting a user to migrate the repeated transaction, and receiving authorization from the user accepting the prompt, the aggregation module 104 may use a second set of electronic credentials of the user to migrate the repeated transaction to a different service provider 108 (e.g., using a user's electronic credentials for a streaming video service such as Netflix® to change the default payment source to a credit or debit card associated with a different financial institution service provider 108, or the like).

An aggregation module 104 may be configured to process aggregated and/or downloaded transaction data and/or item-level data to identify one or more repeating transactions. For example, an aggregation module 104 may identify common and/or similar text strings in records for different instances of a repeating transaction (e.g., a text string associated with the same service provider 108), may identify a pattern in timing (e.g., time of day, day of the week, day of the month, day of the year, week of the year, month of the year, or the like) based on a timestamp or other date record for a repeating transaction, may correlate numerical values for different instances of a repeating transaction (e.g., the same value or within a threshold amount of the same value; the same monetary amount or within a threshold amount of the same monetary amount; or the like), may identify a similar transaction identifier and/or service provider 108 identifier (e.g., a name, URL or other address, or the like), may use artificial intelligence and/or machine learning to correlate transaction data into one or more repeating transactions, and/or may otherwise identify one or more repeating transactions.

A central aggregation module 104b, in certain embodiments, may process aggregated sets of transactions for multiple users (e.g., each of a service provider 108's users, or the like) to identify repeating transactions and may dynamically target and/or select certain repeated transactions for certain users based on the aggregated sets of transactions. For example, in one embodiment, an aggregation module 104 may determine whether or not to prompt a user to migrate a repeating transaction (e.g., subsequent instances of a repeating transaction identified in historical aggregated sets of transaction data) based on a likelihood that an aggregated set of transactions for the user includes each transaction for the user of an transaction type of the aggregated set of transactions (e.g., all or substantially all of a user's social media posts from all of the user's social media accounts, all or substantially all of a user's financial transactions from all of the user's financial accounts, or the like). In a further embodiment, instead of and/or in addition to being based on a likelihood that an aggregated set of transactions for the user includes each transaction for the user of an transaction type, an aggregation module 104 may determine whether or not to prompt a user to migrate a repeating transaction to a different service provider 108 based on an estimated value to the different service provider 108 of migrating the repeating transaction (e.g., of migrating subsequent instances of the repeating transaction) based on values associated with the repeated transaction in the aggregated set of transactions for the user.

In one embodiment, an aggregation module 104 selects a user for migrating a repeating transaction and/or selects a repeating transaction for migrating in response to the user's transaction data satisfying a transaction metric associated with the repeating transaction (e.g., associated by transaction type, by service provider 108, or the like). As used herein, a transaction metric may include a measurable or estimable quantity or unit of a repeating transaction that can be used to select a user and/or a repeating transaction for migrating to a different service provider 108. A transaction metric, in various embodiments, may include a lifetime value metric, a total spend metric, a transaction interval metric, an interest rate for a repeating transaction, a sum total spent on a repeating transaction, a price per repeating transaction, a monthly payment amount for a repeating transaction, a profit margin for a repeating transaction, a fee for a repeating transaction, a geographical transaction metric, an income metric for a user associated with a repeating transaction, a savings metric associated with a repeating transaction, and/or the like.

A transaction metric, in one embodiment, comprises a lifetime value metric indicating a projected and/or estimated total value of a user to a different service provider 108 to which a repeating transaction is migrated (e.g., based on the user's aggregated set of transactions and/or on a cost of the migration to the different service provider 108), or the like. For example, an aggregation module 104 may determine and/or estimate, based on a user's aggregated set of transactions, an amount the user is likely to spend on subsequent instances of the repeating transaction (e.g., based on previous costs and/or profits associated with the repeating transaction), how loyal a user is likely to be to the different service provider 108 after the migration (e.g., based on a determined amount of time the user has used the previous service provider 108, how often the user has previously migrated the repeating transaction, or the like), or the like, and may determine a lifetime value metric based on one or more of the foregoing determinations.

A transaction metric, in certain embodiments, comprises a total spend metric indicating a confidence of whether a user's aggregated set of transactions includes each of the user's transactions of an associated transaction type (e.g., each of the user's financial transactions from multiple financial institutions 108 for aggregated financial data, each of the user's social media posts from multiple social media networks 108 for aggregated social media data, or the like), aggregated from multiple entities (e.g., banks, credit unions, credit card companies or other lenders, payment processing companies, online payment providers, and/or the like for financial transaction events). If there is a low confidence or probability that an aggregation module 104 has access to each of the user's transactions of a certain type (e.g., a complete and/or substantially complete financial snapshot for the user for aggregated financial transactions), it may be unlikely that an aggregation module 104's determination of whether the user's financial transaction data satisfies a transaction metric associated with a repeating transaction is accurate, and a new service provider 108 may therefore find the user a poor candidate for the migrating the repeating transaction, due to the uncertainty of whether the user's aggregated transaction data is complete. Conversely, if there is a high confidence or probability that an aggregation module 104 has access to each of a user's transactions for the user of a transaction type (e.g., a complete and/or substantially complete financial snapshot for the user for aggregated financial transactions), a new service provider 108 may have greater trust in an aggregation module 104's selection of the user, and may prompt the user to migrate the repeating transaction with greater certainty.

An aggregation module 104, in certain embodiments, may analyze and/or process a user's aggregated set of transactions using one or more rules, flags, indicators, and/or the like, to determine a total spend metric indicating a confidence of whether the user's aggregated set of transactions includes each of the user's transactions of a transaction type (e.g., over a predefined period). For example, in one embodiment, an aggregation module 104 may start at a default confidence level (e.g., 50%, 0.5, 0%, 0, 100%, 1, or the like) and may adjust the confidence level for a user's aggregated set of transactions based on one or more confidence factors. An aggregation module 104, in certain embodiments, may decrease a confidence level if one transaction in a transaction pair (e.g., two transactions that are often seen together within a predefined period) is missing, may increase a confidence level if both transactions in a transaction pair are present, or the like. For example, a transaction pair may include a mortgage payment and a utility payment; a payment credit on a credit card statement and a corresponding debit from a bank account; a car payment and fuel purchases; and/or another transaction pair.

In a further embodiment, an aggregation module 104 may increase a confidence level of a total spend metric if one or more predefined key transactions are present, and/or may decrease a confidence level of a total spend metric if one or more predefined key transactions are not present in the aggregated set of transactions for a user. A key transaction, in one embodiment, comprises a transaction that is expected to occur for each user within a predefined period. For example, a key transaction may comprise a direct deposit and/or payroll check deposit, a mortgage and/or rent payment, at least a threshold amount spent on a personal necessity (e.g., food), and/or another expected event or transaction. In certain embodiments, an aggregation module 104 may be configured to prompt a user to add one or more additional accounts for one or more additional service providers 108 in response to determining a confidence level below a threshold for a total spend metric for the user. In another embodiment, an aggregation module 104 may query a user whether the user's aggregated set of transactions includes each of the user's transactions for a transaction type, and may base a confidence level of a total spend metric on the user's answer.

An aggregation module 104, in one embodiment, may determine a confidence level of a total spend metric and/or another transaction metric by processing users' aggregated set of transactions using one or more predefined rules, or the like. In a further embodiment, an aggregation module 104 may determine a confidence level of a total spend metric and/or another transaction metric dynamically, using machine learning or other artificial intelligence, or the like, causing an accuracy of an aggregation module 104's determinations to increase over time (e.g., at least up to a point) as an aggregation module 104 learns from and detects patterns in the aggregated set of transactions.

A geographical transaction metric, in various embodiments, may indicate, based on a user's aggregated transaction data, a geographical location of a user, of a repeating transaction, of a current service provider 108 for a repeating transaction, or the like. A geographic region, in certain embodiments, may comprise a street, a development, a district, a city, a county, a state, and/or another identifiable geographic area.

A transaction metric, in one embodiment, may comprise an income metric indicating a user's income (e.g., monthly, yearly, by source, gross income, disposable income, and/or the like). In a further embodiment, a transaction metric may comprise a savings metric indicating an amount of money a user saves (e.g., balance of a savings account; balance of an investment account; aggregated total of several savings and/or investment accounts; total amount saved; amount saved over a time period such as daily, weekly, monthly, and/or yearly; a rate of saving; and/or the like).

A transaction metric, in one embodiment, comprises a consistency metric indicating an amount of variation in spending for different transactions in a series of repeating transactions. A transaction metric, in certain embodiments, may comprise a transaction interval metric indicating an amount of time spanned by a user's aggregated set of transactions (e.g., one month, two months, three months, six months, a year, two years, three years, and/or the like). For example, in one embodiment, a new service provider 108 for a long term or high valued repeating transaction, may prefer to prompt one or more users with a higher transaction interval metric (e.g., with a longer amount of time spanned by the users' aggregated set of transactions), while a new service provider 108 for a smaller value repeating transaction, may not have such a preference and my prompt users with a lower transaction interval metric (e.g., with a shorter amount of time spanned by the users' aggregated set of transactions).

In certain embodiments, an aggregation module 104 may provide an interface (e.g., a graphical user interface (GUI), an application programming interface (API), a command line interface (CLI), and/or the like) for an administrator or other user associated with a service provider 108 to set one or more thresholds whereby a user's aggregated set of transactions may satisfy a transaction metric for migrating a repeating transaction to the service provider 108. By setting one or more thresholds whereby a user's aggregated set of transactions may satisfy a transaction metric, a service provider 108 may target certain users for migrating repeating transactions based on the users' history of transactions. An aggregation module 104, in one embodiment, may allow a service provider 108 to select a cap and/or a minimum on a number of users that will receive a prompt to migrate a repeating transaction, to adjust one or more thresholds of a transaction metric until at least a minimum number of users are selected, and/or the like.

Figure 2:
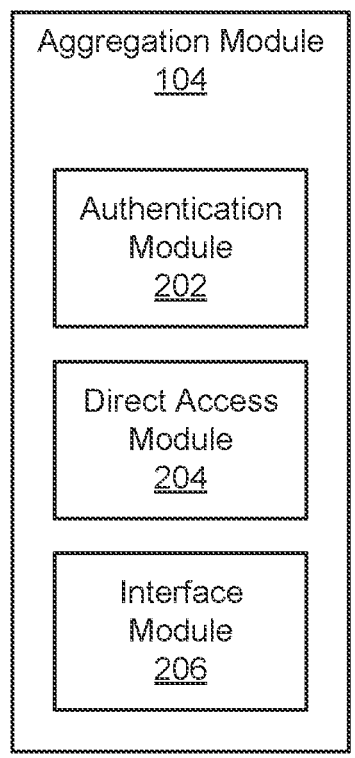
FIG. 2 is a schematic block diagram of one embodiment of an aggregation module.

FIG. 2 depicts one embodiment of an aggregation module 104. In the depicted embodiment, the aggregation module 104 includes an authentication module 202, a direct access module 204, and an interface module 206.

In one embodiment, the authentication module 202 receives a user's electronic credentials for a third party service provider 108 from the user on a hardware device 102 of the user. In a further embodiment, the authentication module 202 may receive electronic credentials for a different user (e.g., from a different hardware device 102, from a backend aggregation module 104, or the like), which may be encrypted and/or otherwise secured, so that the direct access module 204 may download data for the different user (e.g., downloading data for multiple users from a single user's hardware device 102).

For example, in the system 100, if one user's hardware device 102 is turned off, asleep, out of battery, blocked by a third party service provider 108, or the like, in certain embodiments, an aggregation module 202 on a different user's hardware device 102 and/or on a backend hardware server 110 may download data for the one user, using the one user's electronic credentials, and may send the data to the one user's hardware device 102, may send an alert and/or push notification to the one user's hardware device 102, or the like. In this manner, in one embodiment, a user may continue to aggregate data, receive alerts and/or push notifications, or the like, even if the user's own hardware device 102 is blocked, unavailable, or the like. In cooperation with one or more authentication modules 202, the aggregation modules 104a, 104b, in certain embodiments, may communicate with each other using a secure and/or encrypted protocol, and/or may store electronic credentials in a secure and/or encrypted manner, so that a user may not see and/or access another user's electronic credentials, downloaded data, or other private and/or sensitive data.

In embodiments where an aggregation module 104 comprises hardware (e.g., a semiconductor integrated circuit device such as an FPGA, an ASIC, or the like), the authentication module 202 may comprise dedicated security hardware for storing and/or processing electronic credentials, downloaded data, and/or other sensitive and/or private data, such as a secure cryptoprocessor (e.g., a dedicated computer on a chip or microprocessor embedded in a packaging with one or more physical security measures) which does not output decrypted data to an unsecure bus or storage, which stores cryptographic keys, a secure storage device; a trusted platform module (TPM) such as a TPM chip and/or TPM security device; a secure boot ROM or other type of ROM; an authentication chip; or the like. In another embodiment, the authentication module 202 may store and/or process electronic credentials, downloaded data, and/or other sensitive data in a secure and/or encrypted way using software and/or hardware of a user's existing hardware device 102 (e.g., encrypting data in RAM, NAND, and/or other general purpose storage) with or without dedicated security hardware. In certain embodiments, the authentication module 202 may encrypt and/or secure data (e.g., electronic credentials, downloaded data) associated with a first user that is received by, processed by, and/or stored by a second (e.g., different) user's hardware device 102 (e.g., from the first user's hardware device 102 over the data network 106 or the like), preventing the second user from accessing the first user's data while still allowing the first user's data to be downloaded and/or aggregated from a different user's hardware device 102.

In one embodiment, as described above, electronic credentials may comprise one or more of a username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or other information whereby the authentication module 202 may authenticate and/or validate an identity of and/or an authorization of a user.

The authentication module 202, in certain embodiments, may receive different credentials from a user for different accounts of the user with different third party service providers 108 (e.g., different ecommerce sites or other online retailers or service providers, different social networks, different photo sharing sites, different financial institutions) so that the aggregation module 104 may download, aggregate, and/or combine the user's data from the multiple different third party service providers 108. In one embodiment, as described below with regard to the password manager module 306 of FIG. 3, the authentication module 202, instead of and/or in addition to receiving one or more passwords or other electronic credentials from a user, may manage and/or determine one or more passwords or other electronic credentials for a user for one or more third party service providers 108. For example, in certain embodiments, the authentication module 202 may receive an initial set of electronic credentials (e.g., a username and a password) from a user for an account of the user with a third party service provider 108, and the authentication module 202 may use the initial set of electronic credentials to access the user's account with the third party service provider 108 to set a new password, determined by the authentication module 202. The authentication module 202, in one embodiment, may determine passwords or other electronic credentials that are more secure than those typically created by and/or memorable to a user (e.g., longer, more numbers, greater variation between capital and lowercase letters, more frequently changed, or the like).

In one embodiment, the direct access module 204 accesses one or more servers 108 of one or more third party service providers 108, from a hardware device 102 of a user and/or from a backend hardware server 110, using a user's electronic credentials from the authentication module 202 (e.g., for the user associated with the hardware device 102, for a different user, or the like). The direct access module 204, in certain embodiments, downloads data associated with a user (e.g., a user's social media posts, a user's photos, a user's financial transactions, or the like) from one or more servers 108 of one or more third party service providers 108 to a hardware device 102 of a user (e.g., of the user associated with the downloaded data, of a different user for processing and/or for transfer to the hardware device 102 of the user associated with the downloaded data, or the like) and/or to a backend hardware server 110 associated with the direct access module 204, instead of or in addition to downloading the data directly to a hardware device 102 of the user (e.g., based on an availability of the hardware device 102 of the user, to backup the data in a second location, or the like).

The direct access module 204, in certain embodiments, may use a webpage interface of a server 108 of a third party service provider 108 to access the server 108 using a user's electronic credentials and/or to download data associated with the user. For example, in certain embodiments, the direct access module 204 may download/load a webpage from a server 108 of a third party service provider 108, enter a username and password or other electronic credentials for a user into textboxes in a form on the webpage, submit the username and password or other electronic credentials using a submit button or other interface element of the webpage, and/or otherwise submit electronic credentials using a website to gain authorized access to data on the server 108 associated with the user. As described below, the pattern module 308 may receive and/or provide instructions enabling the direct access module 204 to access a server 108 (e.g., a location or method for submitting electronic credentials, or the like).

In response to successfully authenticating with and accessing a server 108 of a third party service provider 108 with a user's electronic credentials, the direct access module 204 may download data associated with the user (e.g., from a user's account or the like) from the server 108, to a hardware device 102 associated with the user, to a backend hardware server 110, to a hardware device 102 of another user downloading the data in proxy for the user, or the like. As described below, in certain embodiments, the pattern module 308 may receive and/or provide instructions enabling the direct access module 204 to download data associated with a user from a server 108 of a third party service provider 108 (e.g., a URL or other link to a location for the data, a label or other identifier for locating the data within one or more webpages or other data structures, or the like). The direct access module 204, in certain embodiments, may follow instructions from a pattern module 308 to authenticate and/or access data from one or more webpages from a server 108 in a screen scraping manner, parsing one or more webpages to locate an entry location and/or submit electronic credentials; to locate, download, and/or extract data associated with a user; or the like.

In one embodiment, the direct access module 204 sends or otherwise submits electronic credentials and/or receives or otherwise downloads data using an API or other access protocol of a server 108 of a third party service provider 108. For example, the direct access module 204 may send a request in a format specified by and/or compatible with a server 108 (e.g., an API server 108) of a third party service provider 108. The sent request may comprise electronic credentials for a user or a portion thereof (e.g., a username and/or a password), a subsequent request may comprise electronic credentials for a user or a portion thereof (e.g., in response to receiving an acknowledgment from the server 108 for the first request, or the like), and/or the direct access module 204 may use a different access protocol of a server 108.

In response to a request for data from the direct access module 204 (e.g., in response to the direct access module 204 authenticating a user using an access protocol of a server 108), a server 108 of a third party service provider 108 may send and/or return data associated with a user (e.g., in one or more messages, packets, payloads, as a URL or other pointer to a location from where the direct access module 204 may retrieve the data, or the like). The direct access module 204, in various embodiments, may receive data associated with a user directly from a server 108 of a third party service provider 108 over a data network 106; may receive a pointer, URL or other link to a location of data associated with a user from a server 108 of a third party service provider 108; may receive data associated with a user from another entity on a data network 106 (e.g., in response to a request from the server 108 of the third party service provider 108 to the other entity or the like); or may otherwise receive data associated with a user according to an access protocol of a third party service provider 108.

In one embodiment, a third party service provider 108 provides a direct access module 204 with an API or other access protocol. In a further embodiment, a direct access module 204 may act as a wrapper for and/or a plugin or extension of, an application of a third party service provider 108 (e.g., a mobile application), and the application may have access to an API or other access protocol of the third party service provider 108. In another embodiment, a direct access module 204 may be configured to use an API or other access protocol in a same manner as an application of a third party service provider 108 (e.g., a mobile application), through observation of the application of the third party service provider 108 or the like. In certain embodiments, a direct access module 204 may cooperate with an application of a third party service provider 108, a web browser through which a user accesses services of a third party service provider 108, or the like to access data associated with a user (e.g., accessing data already downloaded by an application and/or user, accessing a database or other data store of an application and/or web browser, scanning and/or screen scraping a web page of a third party service provider 108 as a user accesses the web page, or the like).

The direct access module 204, in certain embodiments, may access different third party service providers 108 in different manners. For example, a first third party service provider 108 may grant the direct access module 204 with access to an API or other access protocol, while the direct access module 204 may use a web page interface (e.g., screen scraping) to access and download data from a second third party service provider 108, or the like. In one embodiment, a remote backend hardware server 110 may be associated with a first party service provider 108 (e.g., a vendor and/or provider of an aggregation module 104) and the direct access module 204 may download data associated with a user from both the first party service provider 108 and from one or more third party service providers 108, aggregating the data together so that the user may access the data in a single interface and/or application. For example, as described below with regard to the interface module 206, the interface module 206 may provide a user access to the user's photos from multiple third party cloud storage providers 108 within a single photo application, may provide a user with access to the user's personal financial information within a single personal financial management application and/or online banking application, may provide a user with access to posts from multiple social networks within a single social networking application, or the like.

The direct access module 204, in certain embodiments, may store downloaded and/or aggregated data independently from the one or more third party service providers 108. For example, the direct access module 204 may store a user's downloaded and/or aggregated data on a hardware device 102 of the user, on a backend hardware server 110 accessible by the user, or the like. In this manner, in certain embodiments, a user may control and/or access the user's data, even if a third party service provider 108 closes down or is not available, may use the user's data in any manner desired by the user even if the use is not supported by a third party service provider 108, or the like.

In one embodiment, the interface module 206 provides a user's data downloaded by the direct access module 204, from a hardware device 102 of a user (e.g., of the user associated with the downloaded data, of a different user) to another entity, such as a hardware device 102 of a user associated with the downloaded data (e.g., in response to the data being downloaded by a hardware device 102 of a different user, from one hardware device 102 of a user to another hardware device 102 of the same user), a remote server 110 unaffiliated with (e.g., not owned by, operated by, controlled by, or the like) the third party service provider 108 from which the data was downloaded, or the like. For example, the interface module 206 may provide an API or other interface to provide a user's downloaded and/or aggregated data to a hardware device 102 of the user, to a backend aggregation module 104*b*, to a backend hardware server 110, to a different third party service provider 108, to a different/second hardware device 102 of the user, or the like.

In certain embodiments, it may be transparent and/or substantially transparent to a user which hardware device 102, 110 has downloaded data associated with the user. For example, the interface module 206 may provide downloaded data associated with a user from one hardware device 102 of the user to another hardware device 102 of the user, from a hardware device 102 of the user to a backend hardware server 110 (e.g., from which the user may access the data using a web browser, an application, or the like), from a backend hardware server 110 to a hardware device 102 of the user, or the like, allowing the user to access the data from a different location than the location to which the data was downloaded.

In certain embodiments, the interface module 206 provides a GUI on a hardware device 102 of a user, and provides downloaded data associated with the user to the user through the GUI (e.g., allowing the user to view the data directly, providing one or more notifications and/or recommendations to the user based on the data, providing one or more tables or charts to the user based on the data, providing a summary of or one or more statistics related to the data, or the like). The interface module 206, in various embodiments, may provide a GUI to the user from the same hardware device 102 to which the data was downloaded, on a different hardware device 102 than the hardware device 102, 110 to which the data was downloaded, or the like.

For example, in one embodiments, where the data associated with a user comprises photos, the interface module 206 may provide a photo management interface, a photo editing interface, or the like wherein the user may view and/or otherwise access the user's downloaded and/or aggregated photos. In a further embodiment, where the data associated with a user comprises the user's financial transaction history (e.g., purchases and/or other financial transactions downloaded from one or more ecommerce sites 108 or other online retailers 108 or service providers 108; one or more financial institutions 108 such as banks, credit unions, lenders, or the like; and/or another entity), the interface module 206 may provide a personal financial management interface, with a list of transactions (e.g., with item level data identifying multiple individual items within a single purchase), one or more budgets, one or more financial goals, a debt management interface, a net worth interface, and/or another personal financial management interface wherein the user may view the user's downloaded and/or aggregated financial transaction history, and/or alerts or recommendations based thereon. In another embodiment, where the data associated with a user comprises social media posts, the interface module 206 may provide a GUI comprising a stream, feed, and/or wall of social media posts for the user to view (e.g., downloaded and/or aggregated social media posts from multiple social networks 110, from different contacts or friends of the user, or the like).

Figure 3:
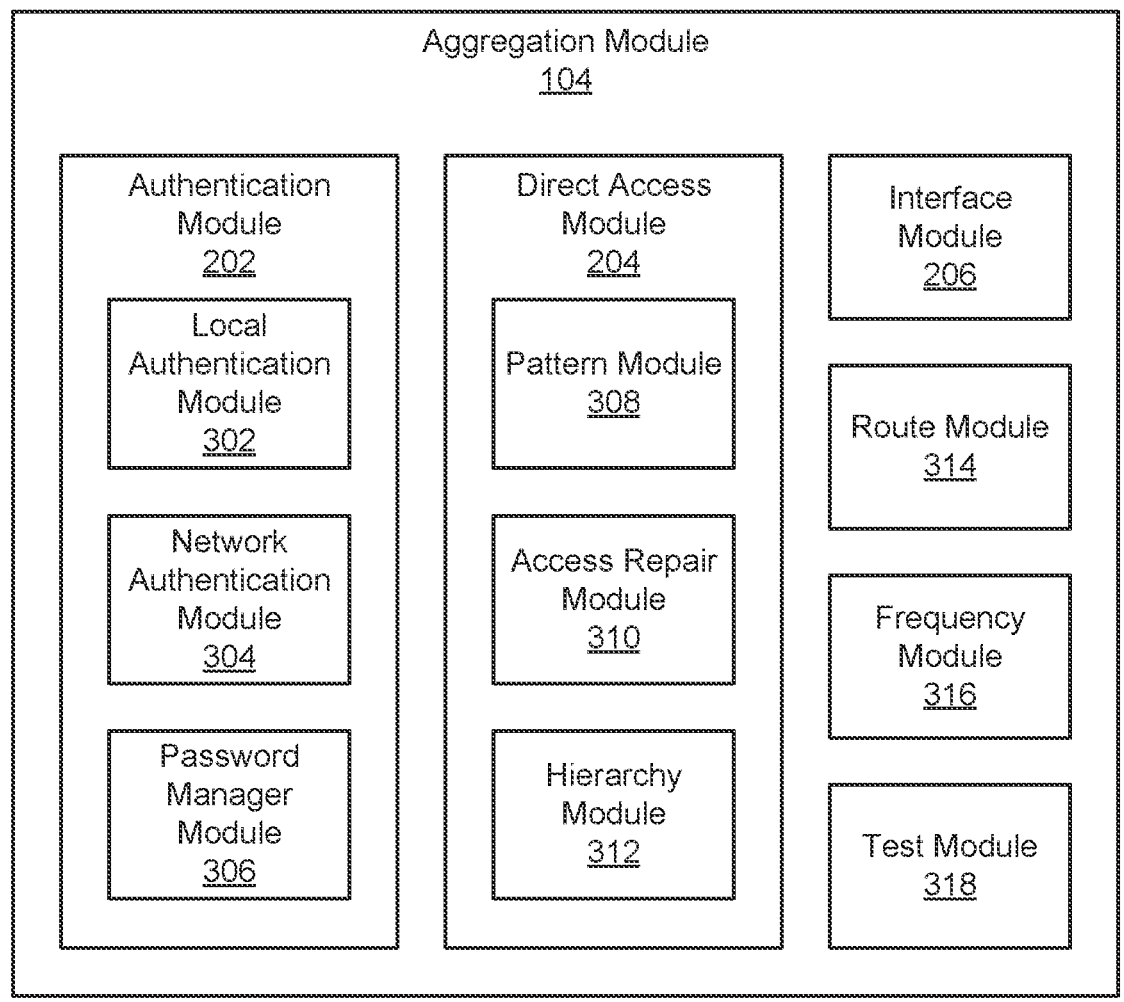
FIG. 3 is a schematic block diagram of another embodiment of an aggregation module.

FIG. 3 depicts another embodiment of an aggregation module 104. In the depicted embodiment, the aggregation module 104 includes an authentication module 202, a direct access module 204, and an interface module 206 and further includes a route module 314, a frequency module 316, and a test module 318. The authentication module 202, in the depicted embodiment, includes a local authentication module 302, a network authentication module 304, and a password manager module 306. The direct access module 204, in the depicted embodiment, includes a pattern module 308, an access repair module 310, and a hierarchy module 312.

In one embodiment, the local authentication module 302 secures and/or authenticates the user's access to downloaded data, to stored passwords, and/or other data on a user's hardware device 102, transferred to and/or from a user's hardware device 102, or the like. For example, the local authentication module 302 may cooperate with one or more security and/or authentication systems of the user's hardware device 102, such as a PIN, password, fingerprint authentication, facial recognition, or other electronic credentials used by the user to gain access to the hardware device 102. In a further embodiment, the local authentication module 302 may authenticate a user before allowing the interface module 206 to provide the user access to downloaded/aggregated data and/or alerts or other messages. For example, the local authentication module 302 may manage and/or access electronic credentials associated with the aggregation module 104, for a user, and may authenticate the user in response to the user accessing an application and/or service of the aggregation module 104.

In certain embodiments, the local authentication module 302 may encrypt and/or otherwise secure, on a user's hardware device 102, electronic credentials and/or downloaded data associated with a different user, so that the user may not access data associated with the different user, but the different user may access the data once it is transmitted to a hardware device 102 of the different user, to a backend hardware server 110, or the like. Local authentication modules 302 of different hardware devices 102, 110 may cooperate to securely transfer data (e.g., one or more electronic credentials, downloaded data, or the like) over the data network 106, from one hardware device 102, 110 to another hardware device 102, 110. In a further embodiment, the local authentication module 302 may ensure that a user's electronic credentials and/or downloaded data remain on a single hardware device 102 (e.g., are not transmitted on a data network 106), in a secure repository or the like, and are not stored on and/or accessible to a backend hardware server 110, a hardware device 102 of another user, or the like.

In one embodiment, the network authentication module 304 receives and/or stores a user's electronic credentials for one or more third party service providers 108 on a hardware device 102 of the user, on a backend hardware server 110, or the like. The network authentication module 304, in various embodiments, may receive a user's electronic credentials from the user, from a hardware device 102 of the user, from a backend hardware server 110, or the like. The network authentication module 304 may cooperate with the direct access module 204 to provide a user's electronic credentials to a server 108 of a third party service provider 108 (e.g., the network authentication module 304 may provide electronic credentials to the direct access module 204 to provide to a server 108, the network authentication module 304 may provide electronic credentials directly to a server 108, or the like).

The network authentication module 304, in certain embodiments, may cooperate with the local authentication module 302 to encrypt and/or otherwise secure a user's electronic credentials for one or more third party service providers 108, on a hardware device 102 of a user, on a data network 106, on a hardware device 102 of a different user, on a backend hardware server 110, while being provided to a server 108 of a third party service provider 108, or the like. In a further embodiment, the network authentication module 304 ensures that a user's electronic credentials are only stored on a user's hardware device 102 and sent from the user's hardware device 102 to a server 108 of a third party service provider 108, and does not store a user's electronic credentials on a backend hardware server 110, on a different user's hardware device 102, or the like. In another embodiment, the network authentication module 304 may securely store (e.g., using secure encryption) a user's electronic credentials for a third party service provider 108 on a backend hardware server 110, on a different user's hardware device 102, or the like, so that a direct access module 204 may access and/or download data associated with the user, even if the hardware device 102 of the user is unavailable, blocked, or the like, as described below with regard to the route module 314. In certain embodiments, whether the network authentication module 304 and/or the local authentication module 302 allow electronic credentials to be sent to and/or stored by a different user's hardware device 102, a backend hardware server 110, or the like may be based on a setting defined based on user input, so that the user may decide a level of security, or the like.

In one embodiment, the password manager module 306 may manage and/or store electronic credentials of a user for a plurality of third party service providers 108, so that the direct access module 204 may access and/or download data associated with the user from each of the plurality of third party service providers 108. The password manager module 306, in certain embodiments, may generate and/or otherwise manage different, secure, credentials for each of a plurality of third party service providers 108.

The password manager module 306, in one embodiment, may securely store generated credentials for a user on a hardware device 102 of the user, so that the user does not have to remember and enter the generated electronic credentials. For example, in addition to allowing a direct access module 204 to access a third party service provider 108 using generated electronic credentials, the password manager module 306 may automatically populate one or more interface elements of a form on a webpage with electronic credentials (e.g., a username, a password) of the user, in response to the user visiting the web page in a web browser, or the like, without the user manually entering the electronic credentials. The password manager module 306, in certain embodiments, may periodically update (e.g., regenerate different credentials, such as a different password, and update the user's account with the third party service provider 108 with the regenerated different credentials) electronic credentials for a user, such as every week, every month, every two months, every three months, every four months, every five months, every six months, every year, every two years, in response to a user request, in response to a request from a third party service provider 108, and/or over another time period or in response to another periodic trigger.

The password manager module 306, in one embodiment, may synchronize a user's electronic credentials (e.g., provided by the user, generated by the password manager module 306, or the like) across different hardware devices 102, web browsers, or the like of a user. For example, in response to a password manager module 306 and/or the user updating or otherwise changing electronic credentials, the password manager module 306 may propagate the update/change to one or more other password manager modules 306, on different hardware devices 102 of the user, or the like.

In one embodiment, the pattern module 308 determines an ordered list of multiple locations on a server 108 of a third party service provider 108 for the direct access module 204 to access the server (e.g., which may include locations other than where the data of the user is stored and/or accessible), one or more delays for the direct access module 204 to wait between accessing locations on the server 108, or the like. The pattern module 308, in one embodiment, may determine and/or select the multiple locations and/or the one or more delays based on an average pattern identified in behavior of multiple users accessing a third party service provider 108 using a web browser. In a further embodiment, the pattern module 308 determines and/or selects the multiple locations and/or the one or more delays based on a pattern identified in behavior of the user associated with the hardware device 102 on which the pattern module 308 is disposed, accessing the third party service using a web browser of the user's hardware device 102.

In one embodiment, the access repair module 310 detects that access to a server 108 of a third party service 108 and/or data associated with a user is broken and/or inaccessible. The access repair module 310, in certain embodiments, provides an interface to a user allowing the user to graphically identify an input location for the user's electronic credentials, a location of data associated with the user, or the like. The access repair module 310, in one embodiment, processes one or more pages of a server 108 and displays to a user in an interface an estimate of an input location for the user's electronic credentials, a location of data associated with the user, or the like so that the user may confirm whether or not the estimate is correct using the interface.

In one embodiment, the test module 318 cooperates with the access repair module 310, and attempts to access a server 108 of a third party service provider 108 for a plurality of different users (e.g., a sample group or test set), based on an identification from a single user, using electronic credentials of the different users or the like. The test module 318, in certain embodiments, determines whether data associated with the different users (e.g., a sample group or test set) is accessible using the identification from the single user. The test module 318, in one embodiment, provides the identification from a user to other instances of the direct access module 204 for accessing a server 108 of a third party service provider 108 in response to an amount of the different users (e.g., a sample group or test set) for which data is accessible using the identification from the single user satisfying a threshold.

In one embodiment, the hierarchy module 312 provides the direct access module 204 with an ordered list of multiple different sets of instructions for accessing a server 108 of a third party service 108 using a user's electronic credentials, for downloading data associated with the user, or the like. Each different set of instructions, in certain embodiments, comprises a location for entering a user's electronic credentials, an instruction for submitting the user's electronic credentials, one or more locations of the data associated with the user, or the like.

In one embodiment, the route module 314 determines whether a hardware device 102 of a user is available for the direct access module 204 to download data associated with the user from a server 108 of a third party service provider 108. The route module 314, in certain embodiments, may access a server 108 of a third party service provider 108, from a remote backend hardware server 110, using the user's electronic credentials, to download data associated with the user from the server 108 to the remote backend hardware server 110 in response to the route module 314 determining that the hardware device 102 of the user is unavailable. The route module 314, in one embodiment, provides a user one or more alerts on a hardware device 102 of the user based on the data associated with the user downloaded to the remote backend hardware server 110.

In one embodiment, the frequency module 316 sets a frequency with which the direct access module 204 accesses the server 108 of a third party service provider 108. The frequency module 316, in certain embodiments, determines a frequency based on input from a remote backend hardware server 110, which may be unaffiliated with the third party service provider 108 being accessed, so that the remote backend hardware server 110 (e.g., the frequency module 316 executing on the remote backend hardware server 110) determines frequencies for a plurality of direct access modules 204 for different users and different hardware devices 102. In a further embodiment, the frequency module 316 determines a frequency based on input from a user, allowing the user to set the access frequency. The frequency module 316, in certain embodiments, limits an access frequency to prevent inadvertent denial of service by a third party service provider 108, or the like.

Figure 4A:
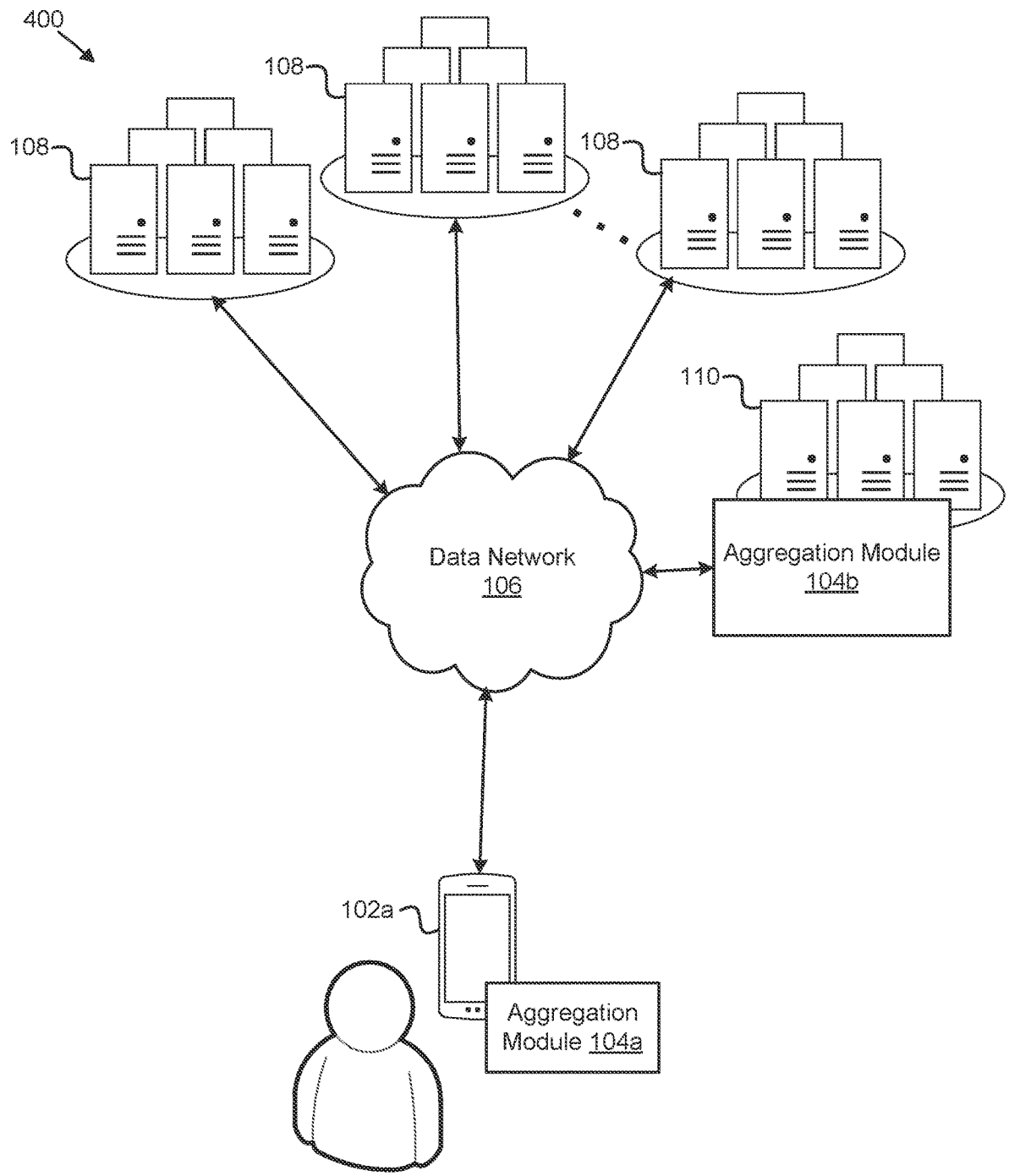
FIG. 4A is a schematic block diagram illustrating an additional embodiment of a system for item level data aggregation.

FIG. 4A depicts one embodiment of a system 400 for item level data aggregation. The system 400, in the depicted embodiment, includes one or more user hardware devices 102 with one or more aggregation modules 104a, and one or more backend hardware servers 110 comprising one or more backend aggregation modules 104b. An authentication module 202 of an aggregation module 104a, in certain embodiments, may securely provide encrypted user credentials for a user from the user's hardware device 102 to a backend aggregation module 104b (e.g., an authentication module 202 of the backend aggregation module 104b) on a backend hardware server 110, over the data network 106 or the like, so that a direct access module 204 of the backend aggregation module 104b may access one or more third party service providers 108 from the backend hardware server 110 (e.g., over the data network 106) to download data associated with the user.

For example, the backend hardware server 110 may download data for the user by default, in response to the user's hardware device 102a being powered off, being asleep, being blocked from accessing one or more third party service providers 108, or the like, as determined by a route module 314, or the like. The interface module 206 of the backend aggregation module 104b may provide one or more alerts/messages to the user based on the downloaded data and/or may provide the downloaded data to the user (e.g., in response to the user's hardware device 102a becoming available, to a different hardware device 102 associated with the first user, directly from the backend hardware server 110 as a web page and/or through a dedicated application, or the like).

Figure 4B:
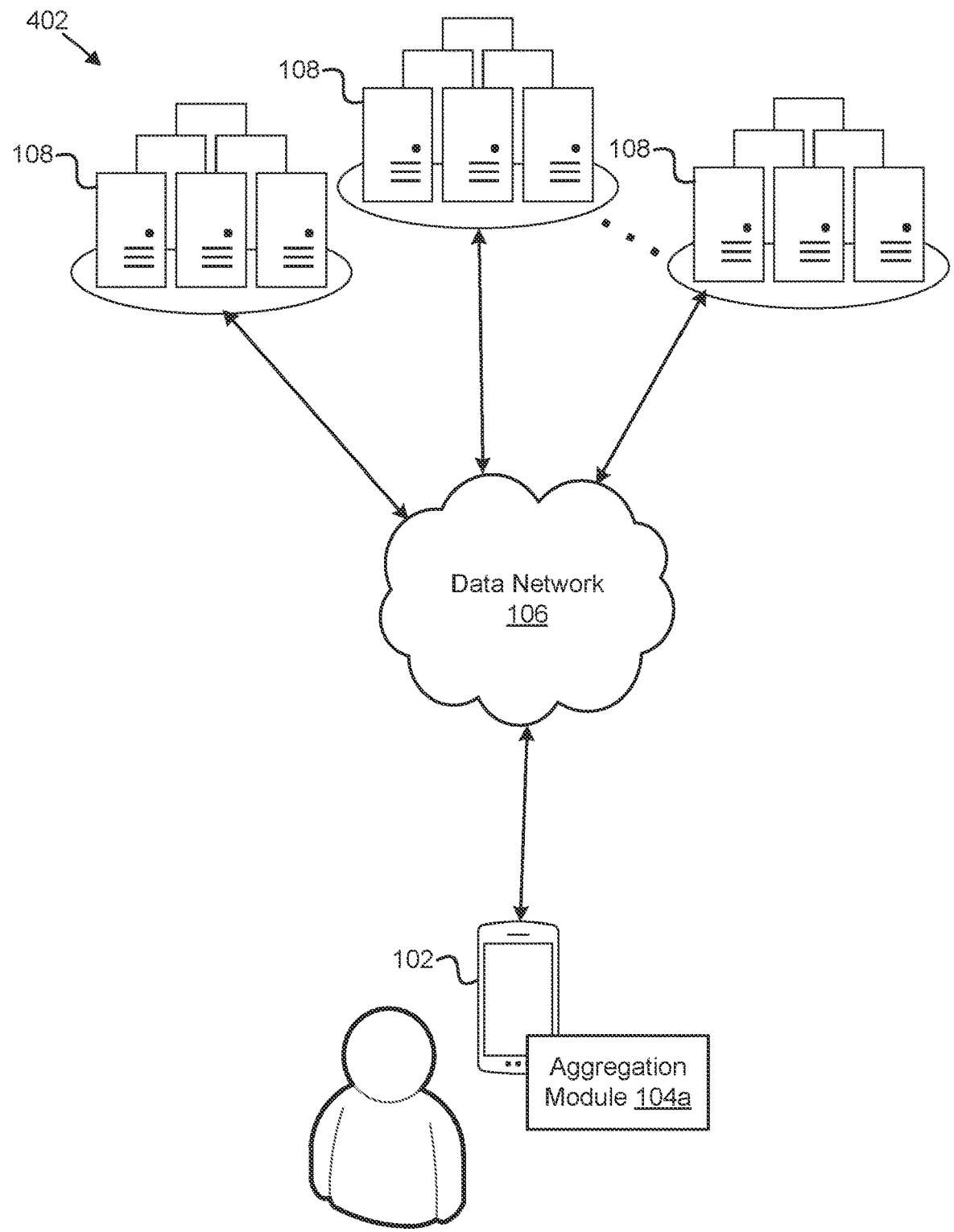
FIG. 4B is a schematic block diagram illustrating a further embodiment of a system for item level data aggregation.

FIG. 4B depicts one embodiment of a system 402 for item level data aggregation. The system 402, in the depicted embodiment, includes a single user hardware device 102 with an aggregation module 104a. An authentication module 202 of the aggregation module 104a, in certain embodiments, may store and/or manage electronic user credentials locally on the user's hardware device 102, the direct access module 204 may access one or more third party service providers 108 directly from the user's hardware device 102 (e.g., over the data network 106) to download data associated with the user to the user's hardware device 102, the interface module 206 may provide the data and/or one or more alerts/messages based on the data to the user from the user's hardware device 102, or the like. In the depicted system 402, the aggregation module 104a may create a local repository of data for the user from one or more third party service providers 108, on the user's hardware device 102, without providing the user's credentials, the user's data, or the like to a different user's hardware device, to a backend hardware server 110, or the like.

Figure 4C:
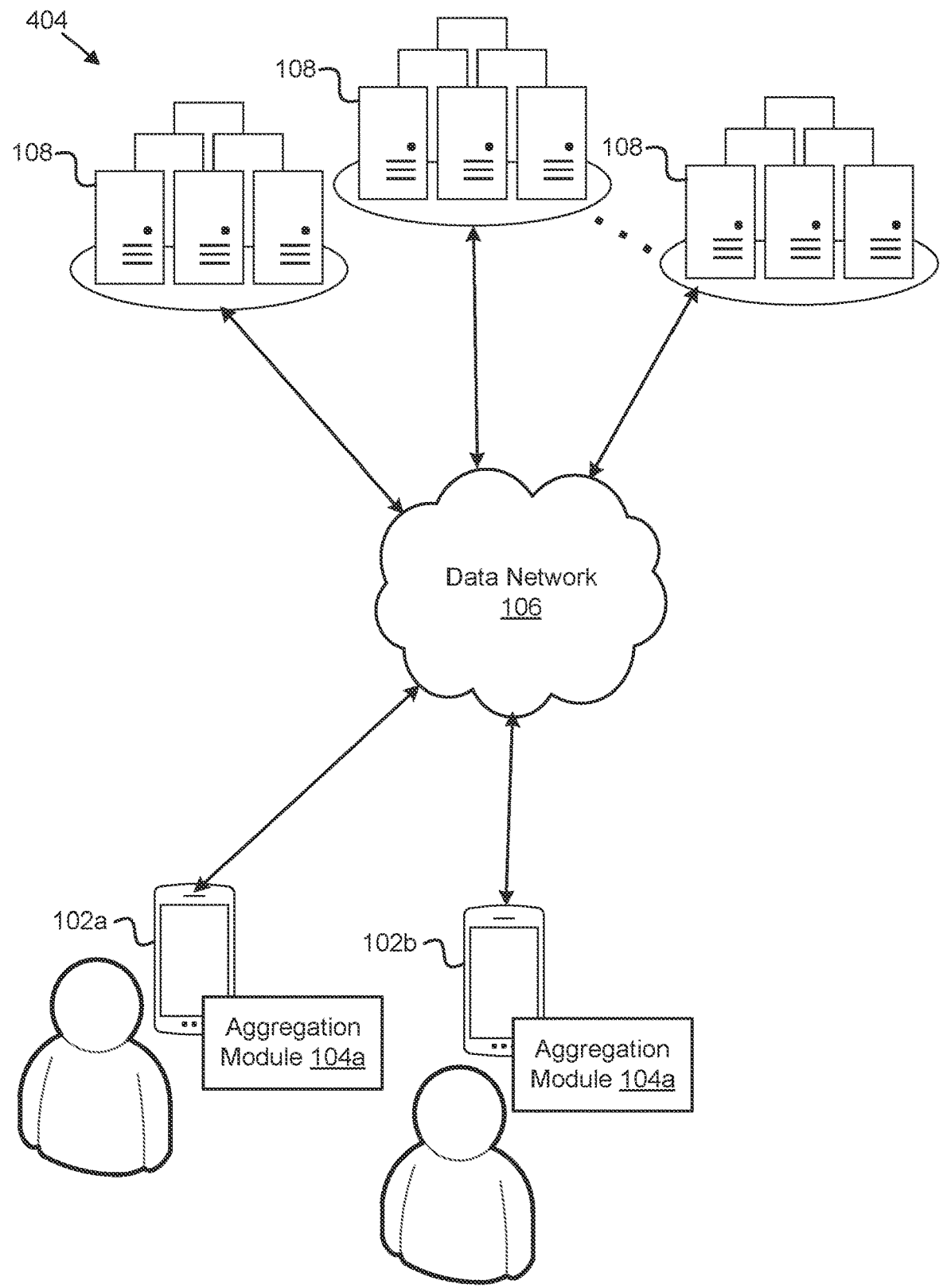
FIG. 4C is a schematic block diagram illustrating a certain embodiment of a system for item level data aggregation.

FIG. 4C depicts one embodiment of a system 404 for item level data aggregation. The system 404, in the depicted embodiment, includes a plurality of user hardware devices 102 with aggregation modules 104a, associated with different users. In certain embodiments, a first aggregation module 104a (e.g., an authentication module 202 of the first aggregation module 104a) may securely provide encrypted user credentials for a first user from the first user's hardware device 102a to a second aggregation module 104a (e.g., an authentication module 202 of the second aggregation module 104a), over the data network 106 or the like, so that a direct access module 204 of the second aggregation module 104a may access one or more third party service providers 108 from the second user's hardware device 102b (e.g., over the data network 106) to download data associated with the first user.

For example, the second user's hardware device 102b may download data for the first user in response to the first user's hardware device 102a being powered off, being asleep, being blocked from accessing one or more third party service providers 108, or the like, as determined by a route module 314, or the like. The interface module 206 of the second aggregation module 104a may provide one or more alerts/messages to the first user based on the downloaded data and/or may provide the downloaded data to the first user (e.g., in response to the first user's hardware device 102a becoming available, to a different hardware device 102 associated with the first user, to a backend hardware server 110 to which the first user has access, or the like). As described above, in certain embodiments, the authentication module 202, the direct access module 204, the interface module 206, and/or the route module 314 may encrypt and/or otherwise secure data for the first user (e.g., the first user's electronic credentials, downloaded data associated with the first user, alerts/messages for the first user), so that it is difficult or impossible for the second user to access the data for the first user, thereby preventing and/or minimizing unauthorized access to the first user's data while providing greater flexibility in devices 102 and/or locations from which data for the first user may be downloaded.

Figure 5A:
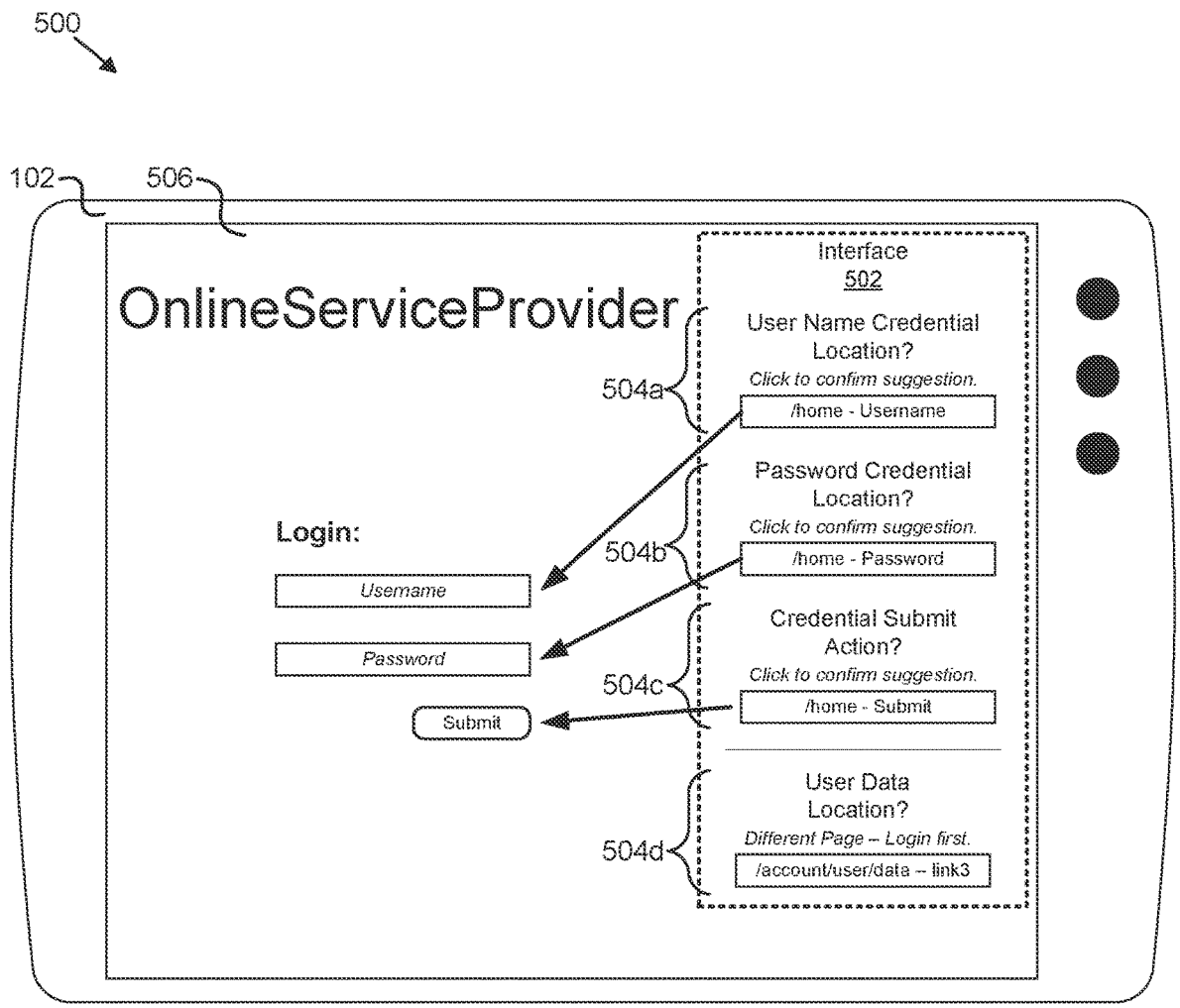
FIG. 5A is a schematic block diagram illustrating one embodiment of a user interface.

FIG. 5A depicts one embodiment of a user interface 500. The interface 500, in certain embodiments, is provided by an access repair module 310 to a user on an electronic display screen of a hardware device 102, allowing a user to graphically identify one or more input locations for the user's credentials (e.g., a location for a username, a location for a password, or the like), a method for sending and/or submitting the user's credentials (e.g., an API specification, a location of a submit button, or the like), a location of data associated with the user (e.g., a URL or other link; a location on a web page at a link; a label, tag, or other identifier within plain text and/or source code of a web page 506; or the like) and/or to graphically identify one or more other instructions for accessing data associated with the user from a third party service provider 108.

In the depicted embodiment, the access repair module 310 overlays an interface 502 over one or more pages of a website 506 of a third party service provider 108 on an electronic display screen of a user's hardware device 102. As described above, in various embodiments, the access repair module 310 may comprise a browser plugin and/or extension which provides an interface 502 within an internet browser, may comprise an embedded browser within an application of the access repair module 310, or may otherwise be integrated with and/or in communication with an internet browser.

The access repair module 310, in the depicted embodiments, determines and/or displays one or more suggestions 504 and/or recommendations 504 for the user, which the user may either confirm or change/correct. For example, the access repair module 310 may display an interface element 504a with a suggested location for the user to enter a user name, an interface element 504b with a suggested location for the user to enter a password, an interface element 504c with a suggested credential submit action, an interface element 504d with a suggested location of data associated with the user, and/or one or more other interface elements allowing a user to graphically identify one or more locations within a website 506 of a third party service provider 108.

In one embodiment, an interface element 504 may include one or more identifiers of an estimated location and/or action which the access repair module 310 has determined (e.g., by scanning and/or parsing one or more pages of a website 506, based on input from other users accessing one or more pages of a website 506, based on previous interactions of the user with one or more pages of a website 506, a prediction made using a machine learning and/or artificial intelligence of a website 506, based on a statistical analysis of historical changes to one or more pages of a web site 506 and/or of one or more similar websites, or the like), such as an arrow or other pointer to a location; a link or other identifier of a location; a box or other highlighting around a location; altering text labeling for a location to make the text bold, italic, and/or underlined; or the like. A user, in certain embodiments, may click, select, or otherwise identify a location to either confirm or change/correct a location suggested by the access repair module 310. For example, a user may click or otherwise select an interface element 504 associated with a location and/or action (e.g., to activate the selected interface element 504) and may click or otherwise select the location and/or perform the action, which the access repair module 310 may record (e.g., automatically populating a text field identifying the location and/or action, recording a macro allowing the action to be automatically repeated without the user, or the like).

The user, in one embodiment, may interact with the website 506 in order to locate and/or identify one or more locations, perform one or more actions, or the like. For example, in certain embodiments, the user may navigate to one or more different pages within the website 506, may login to the website 506 using the user's electronic credentials for the web site 506, may navigate to a different web site 506, may navigate to and/or download data associated with the user from the website 506, may use the website 506 in a usual manner, or the like. As described above with regard to the pattern module 308, the pattern module 308, in one embodiment, may monitor the user's access pattern for the website 506, allowing the direct access module 204 to at least partially emulate the user's access pattern in accessing the website 506, downloading data associated with the user from the website 506, or the like. In the depicted embodiment, the access repair module 310 (and/or an associated browser) displays a browser view of the website 506, with text, images, and/or other elements displayed substantially how an internet browser would display the web site 506, with the addition of the interface 502 displayed over the web site 506, to one side of the website 506, or the like.

Figure 5B:
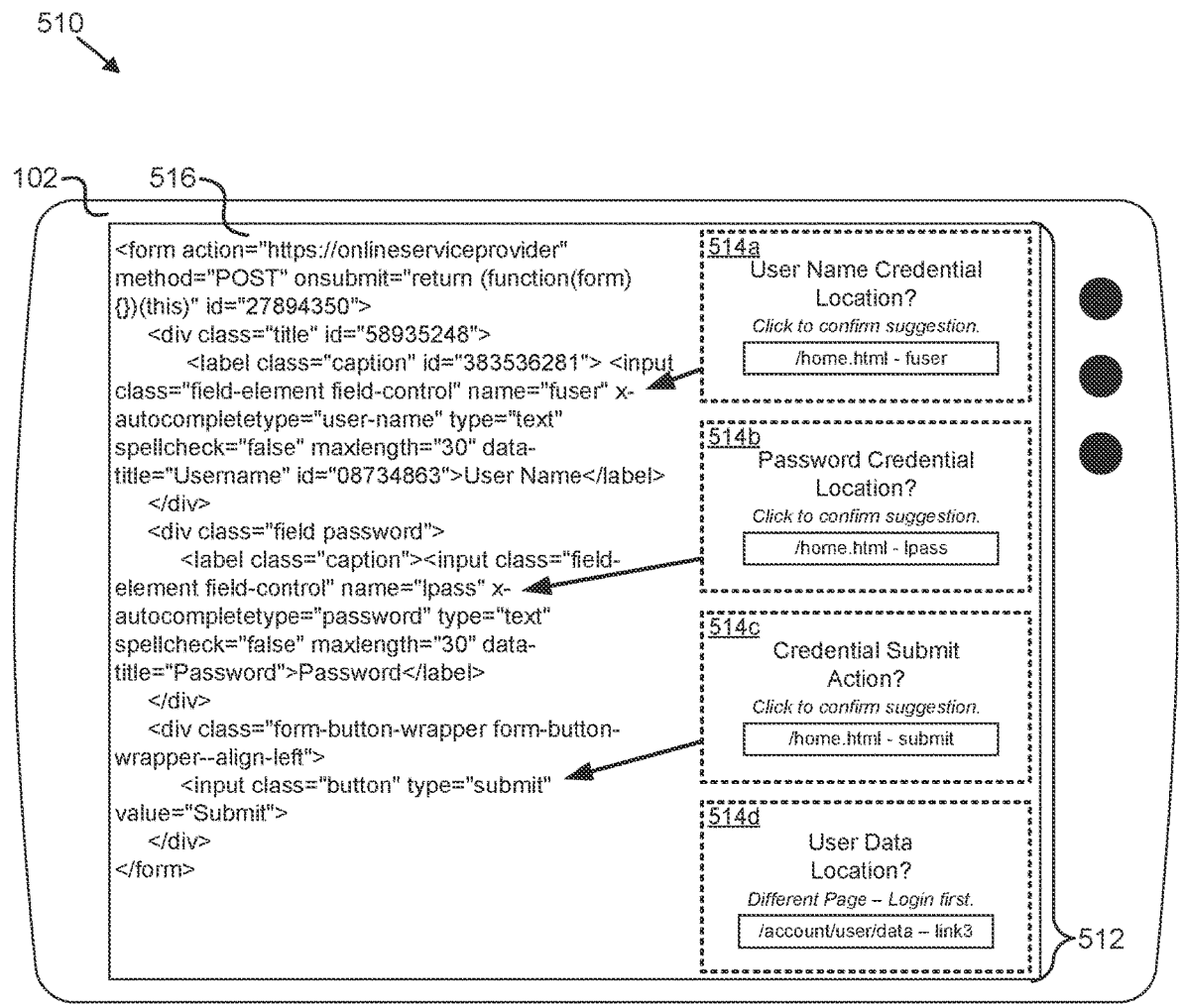
FIG. 5B is a schematic block diagram illustrating another embodiment of a user interface.

FIG. 5B depicts one embodiment of a user interface 510. While the user interface 500 described above comprises a rendered, browser view of one or more pages of a website 506, in one embodiment of the interface 510 of FIG. 5B, the access repair module 310 (and/or an associated browser) displays source code 516 of a website 506. For example, in one embodiment, the user interface 500 may comprise a standard access repair interface and the user interface 510 may comprise an advanced access repair interface, allowing one or more advanced users to identify one or more locations and/or actions within source code 516 of a website 506, which may not be visible and/or readily apparent in the website 506 itself. In certain embodiments, a user may select and/or toggle between a standard user interface 500 or view and an advanced user interface 510 or view.

In the depicted embodiment, the access repair module 310 displays a user interface 512 over and/or adjacent to the displayed source code 516, with one or more interface elements 514a-d allowing a user to identify one or more locations, actions, or the like substantially as described above. The access repair module 310, in the depicted embodiment, displays one or more suggestions and/or estimates of locations and/or actions, which the user may confirm and/or change/correct. In various embodiments, a user may identify a location and/or an action in the source code 516 by selecting and/or activating an interface element 514 and selecting a portion of the source code 516, by dragging a portion of the source code 516 and dropping the portion onto an interface element 514, by cutting and pasting a portion of the source code 516 into an interface element 514, and/or otherwise identifying a location and/or an action based on the source code 516.

In response to a user identifying one or more locations and/or actions (e.g., for entering, submitting, and/or sending electronic credentials; for locating and/or downloading data; or the like), in certain embodiments, the access repair module 310 may cooperate with the test module 318 to perform a live and/or real-time test of the identified one or more locations and/or actions, to determine the validity and/or effectiveness of the identified one or more locations and/or actions while the interface 500, 510 is visible to and/or in use by the user, allowing the user to change and/or correct provided information during the same session. For example, the access repair module 310 may display a test button or other user interface element to a user, which the user may select and/or activate to initiate a test. In another embodiment, the access repair module 310 may automatically perform a test in response to a user providing a location and/or action, without the user selecting and/or activating a test button or other user interface element. In a further embodiment, the test module 318 may perform one or more tests independent of the access repair module 310, with or without testing functionality of the access repair module 310.

Figure 6A:
FIG. 6A is a schematic block diagram illustrating one embodiment of an aggregated set of transactions and item-level data for transactions.
Figure 6A:

FIG. 6A depicts one embodiment of an aggregated set of transactions 600 and of item-level data 610 for transactions. The aggregated set of transactions 600, in the depicted embodiment, comprises a list of financial transactions (e.g., aggregated and/or downloaded for a credit card, checking account, savings account, investment account, and/or another financial account). In other embodiments, the set of transactions 600 may comprise a data backup log with a list of data backup events for a hardware device 102 of a user, a security log with a list of antivirus scan events for a hardware device 102 of a user, an update log with a list of software update events for a hardware device 102 of a user, an operating system log or other software log with a list of error events for a hardware device 102 of a user, or the like.

The aggregated set of transactions 600, in the depicted embodiment, includes an online order 602 from an online merchant, a purchase 604 from a brick and mortar gas station, and a subscription payment 606 to a streaming video service. The item-level data 610, in the depicted embodiment, comprises an order history for an account of the user at the online merchant from the online order 602. In other embodiments, the item-level data 610 may comprise an invoice, an account statement, or the like. The item-level data 610, in the depicted embodiment, includes two items 614, 616 purchased as part of the same transaction, a skillet 614 and an iron 616. The item-level data 610 includes names for the items 614, 616, an order date for the items 614, 616, an image of each item 614, 616 (e.g., a downloadable image file), return information for the items 614, 616, one or more attributes for the items 614, 616 (e.g., physical dimensions, color, weight, or the like), a name of a seller or vendor, a description for the items 614, 616, user reviews for the items 614, 616, user ratings for the items 614, 616, or the like. An aggregation module 104, in certain embodiments, may follow one or more hyperlinks within the item-level data 610 in order to locate and download additional item-level data 610 (e.g., screen scraping and clicking a hyperlink within the listing of an item 614, 616 to locate an image file, a detailed description, user reviews, user ratings, or the like).

In other embodiments, the item-level data 610 may be for the purchase 604 from a brick and mortar gas station, or other brick and mortar retailer or entity. An aggregation module 104 may locate and download the item-level data 610 from a user's online account for the brick and mortar entity (e.g., a loyalty or rewards program, a warranty program, an order history, an invoice, an account statement, or the like). In another embodiment, an aggregation module 104a on a hardware device 102 of a user may scan a printed receipt for the purchase 604 using an optical sensor (e.g., a camera, a scanner, or the like) and may extract item-level data 610 from the scanned printed receipt using optical character recognition (OCR) or the like (e.g., if item-level data 610 is not available for the purchase 604 online, or the like).

In a further embodiment, an aggregation module 104a on a hardware device 102 of a user may wirelessly communicate with a point of sale system of the brick and mortar retailer or other entity to download/receive the item-level data 610 (e.g., using near field communications (NFC), Bluetooth®, Wi-Fi, a radio frequency identifier (RFID), an infrared (IR) signal protocol, a radio frequency (RF) signal protocol, or the like). For example, a point of sale system of the brick and mortar retailer or other entity may send a list of items purchased, purchase prices, or the like wirelessly to a hardware device 102 of a user in order for the user to make an electronic payment using the hardware device 102, or the like.

Figure 6B:
FIG. 6B is a schematic block diagram illustrating one embodiment of a graphical user interface.
Figure 6B:

FIG. 6B depicts one embodiment of a graphical user interface 620, 630. A first graphical user interface 620 includes entries 622 for each transaction 602, 604, 606 and each entry 622 includes a user interface element (e.g., a "+" sign, in the depicted embodiment), for receiving a predefined user input from a user relative to the associated transaction in the displayed set of transactions (e.g., clicking on the "+" sign to expand an entry 622 to display the item-level data 614, 616, causing the aggregation module 104 to display the item-level information 614, 616 and convert the "+" sign to a "−" sign).

In the depicted embodiment, an aggregation module 104 displays identifiers (e.g., image files, names, SKU identifiers, UPCs, EANs, GTINs, prices, categories, vendors, dates, or the like) for the items 614, 616 associated with a transaction 602, 604, 606, in response to detecting the predefined user input from the user (e.g., a click, touch, swipe, keypress, voice command, button press, or the like) relative to an identified transaction. While the depicted embodiment includes items 614, 616 purchased from an online merchant in the online order 602, in other embodiments, the graphical user interface 630 may include item-level data 614, 616 for the purchase 604 from a brick and mortar gas station (e.g., for gasoline purchased, convenience or restaurant purchases, or the like from a gas station), or other brick and mortar retailer or entity, item-level data 614, 616 for the payment 606 to the online video streaming service or other third party service provider 108 (e.g., a list of videos viewed for the month, subscription plan details, or the like), or the like.

In certain embodiments, items 614, 616 within a single transaction may be from multiple categories (e.g., a fuel and a food purchase 604 at the same gas station, or the like). An aggregation module 104 may split an identified transaction into multiple categories (e.g., in a personal financial management and/or digital money management program for a user), based on the downloaded item-level data (e.g., categorizing a fuel purchase in a transportation category and categorizing convenience store purchase in a food and/or shopping category, or the like).

Figure 7:
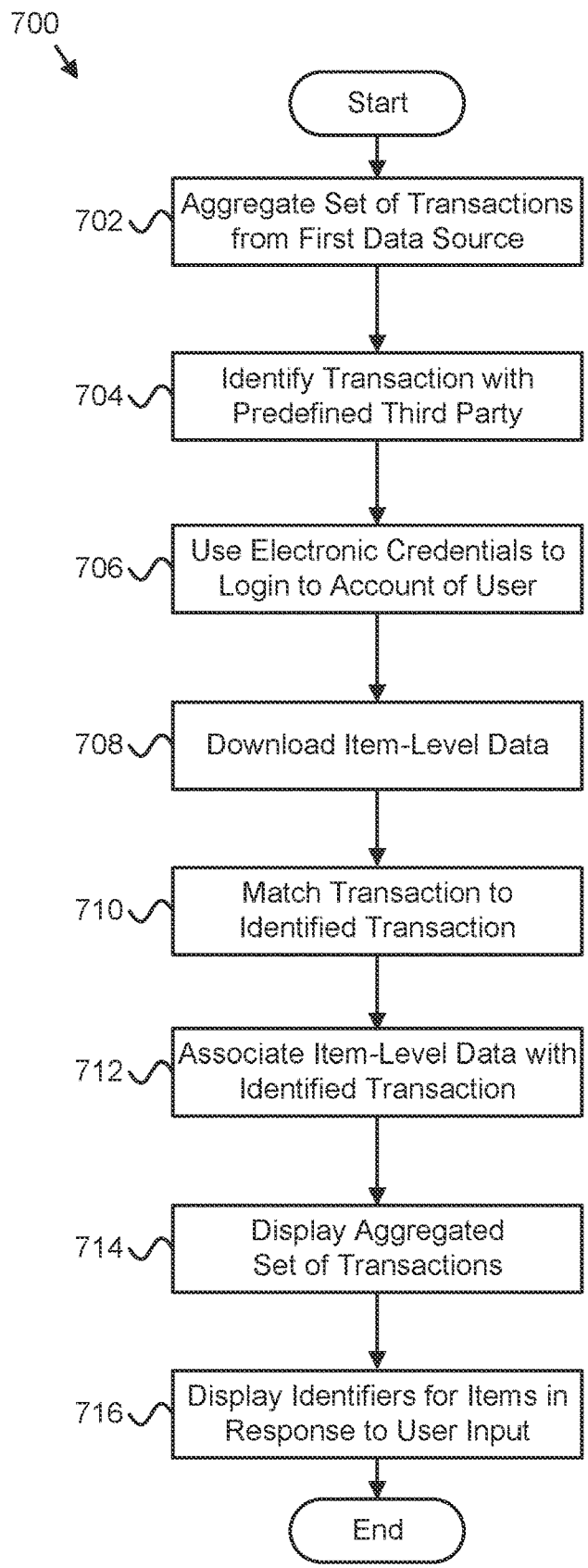
FIG. 7 is a schematic flow chart diagram illustrating a further embodiment of a method for item level data aggregation.

FIG. 7 depicts one embodiment of a method 700 for item level data aggregation. The method 700 begins and an aggregation module 104 aggregates 702 a set of transactions for a user from a first data source (e.g., an aggregation server, a third party service provider 108, a financial institution, or the like). An aggregation module 104 identifies 704 a transaction made with a predefined third party (e.g., a retailer, a vendor, a business, a third party service provider 108, another entity, or the like) within the aggregated 702 set of transactions.

An aggregation module 104 uses 706 electronic credentials for the user to login to an account of the user on a hardware server of the third party. An aggregation module 104 downloads 708 item-level data for a plurality of transactions of the user from the hardware server of the third party. An aggregation module 104 matches 710 one of the plurality of downloaded 708 transactions to the identified 704 transaction (e.g., based on a transaction amount, a transaction date, a party to the transaction, an identifier for the transaction, or the like). An aggregation module 104 associates 712 the downloaded 708 item-level data for the matched 710 transaction from the hardware server of the third party with the identified 704 transaction aggregated 702 from the first data source. Item-level data for the matched 710 transaction, in one embodiment, identifies a plurality of items within the identified 704 transaction.

An aggregation module 104 displays 714 the aggregated 702 set of transactions to the user. In response to receiving predefined user input from the user relative to the identified 704 transaction in the displayed 714 set of transactions, an aggregation module 104 displays 716 identifiers for a plurality of items within the identified 704 transaction to the user and the method 700 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   accessing transaction data for a user from a plurality of service providers where the user has accounts to create an aggregated set of transaction data;
   accessing payment data from at least one third party merchant where the user has conducted a transaction, the payment data comprising item-level data for one or more items included in the transaction;
   accessing additional information for the one or more items by following one or more links within the item-level data for each of the one or more items to locate and download the additional information;

identifying one or more transactions within the aggregated set of transaction data that corresponds to one or more transactions within the payment data; and displaying the aggregated set of transaction data and the item-level data, including the additional information for the one or more items, corresponding to the one or more identified transactions within the aggregated set of transaction data.

2. The method of claim 1, further comprising splitting the identified transactions into multiple categories, each of the multiple categories associated with at least one item corresponding to a transaction.

3. The method of claim 1, further comprising updating at least a portion of the item-level data by re-downloading updated item-level data from a hardware server of the third party merchant in response to a trigger, and displaying the updated item-level data in response to receiving the predefined user input.

4. The method of claim 3, wherein the updated item-level data comprises one or more of an image file for one of the plurality of items, a description for one of the plurality of items, and a rating for one of the plurality of items.

5. The method of claim 1, wherein downloading the item-level data comprises parsing one or more webpages from the hardware server of the third party associated with the account of the user to locate one or more of an invoice, an order history, and an account statement comprising at least a portion of the item-level data.

6. The method of claim 5, wherein downloading the item-level data further comprises downloading supplemental data associated with the plurality of items in response to locating the plurality of items in the one or more of the invoice, the order history, and the account statement, the supplemental data comprising one or more of image files, item descriptions, user ratings, and user reviews for the plurality of items.

7. The method of claim 1, wherein the item-level data comprises one or more of names, stock keeping unit identifiers, universal product codes, international article numbers, and global trade item numbers for the one or more items.

8. The method of claim 1, wherein the third party merchant comprises a point of sale system of a retailer, and the item-level data is accessible from the point of sale system using a wireless communication protocol.

9. The method of claim 1, further comprising:
scanning a printed receipt associated with another transaction from the aggregated set of transaction data using an optical sensor;
extracting item-level data for the other transaction from the scanned printed receipt using optical character recognition, the item-level data for the other transaction identifying a plurality of items within the other transaction; and
displaying identifiers for the plurality of items within the other transaction in response to receiving predefined user input relative to the other transaction in the displayed aggregated set of transactions.

10. The method of claim 9, further comprising downloading supplemental data associated with the plurality of items within the other transaction in response to extracting the plurality of items within the other transaction from the printed receipt, the supplemental data comprising one or more of image files, item descriptions, user ratings, and user reviews for the plurality of items within the other transaction.

11. The method of claim 1, further comprising migrating payment for one or more subsequent transactions with the third party merchant, using electronic credentials for the user, from a first service provider to a different service provider, via a hardware server of the third party merchant in response to authorization from the user.

12. The method of claim 11, wherein migrating the payment for the one or more subsequent transactions with the third party merchant comprises:
logging into a website of the hardware server of the third party merchant using the electronic credentials for the user;
locating one or more user interface elements associated with the payment; and
submitting payment information associated with the different service provider to the website of the hardware server using the one or more user interface elements.

13. The method of claim 1, wherein downloading the transaction data further comprises receiving the transaction data before the user completes payment for the one or more items.

14. The method of claim 1, further comprising:
determining, from a transaction within the set of aggregated transaction data, an online location for accessing item-level data from the third party merchant;
using previously-stored electronic credentials for the user to login to an account of the user at the determined online location for the third party merchant; and
downloading item-level data from the online location of the third party merchant that corresponds to the transaction in response to logging into the user's account at the third party merchant.

15. An apparatus comprising:
a processor; and
a memory that stores code executable by the processor to:
access transaction data for a user from a plurality of service providers where the user has accounts to create an aggregated set of transaction data;
access payment data from at least one third party merchant where the user has conducted a transaction, the payment data comprising item-level data for one or more items included in the transaction;
access additional information for the one or more items by following one or more links within the item-level data for each of the one or more items to locate and download the additional information;
identify one or more transactions within the aggregated set of transaction data that corresponds to one or more transactions within the payment data; and
display the aggregated set of transaction data and the item-level data, including the additional information for the one or more items, corresponding to the one or more identified transactions within the aggregated set of transaction data.

16. The apparatus of claim 15, wherein accessing the payment data comprises parsing webpages from the third parties, the webpages associated with the accounts of the user, to locate one or more of an invoice, an order history, and an account statement comprising at least a portion of the item-level data.

17. The apparatus of claim 15, wherein the code is executable by the processor to split the identified transactions into multiple categories, each of the multiple categories associated with at least one item corresponding to a transaction.

18. A system comprising:
a backend hardware server that:

accesses transaction data for a user from a plurality of service providers where the user has accounts to create an aggregated set of transaction data;
accesses payment data from at least one third party merchant where the user has conducted a transaction, the payment data comprising item-level data for one or more items included in the transaction;
accesses additional information for the one or more items by following one or more links within the item-level data for each of the one or more items to locate and download the additional information; and
identifies one or more transactions within the aggregated set of transaction data that corresponds to one or more transactions within the payment data; and
an aggregation module located on a hardware device for the user, the aggregation module configured to:
display the aggregated set of transaction data and the item-level data, including the additional information for the one or more items, corresponding to the one or more identified transactions within the aggregated set of transaction data.

19. The system of claim 18, wherein the third party merchant comprises a point of sale system and the backend server is further configured to access item-level data for another transaction within the set of transactions from the point of sale system to the hardware device for the user using a wireless communication protocol.

20. The system of claim 18, wherein the aggregation module is further configured to:
scan a printed receipt associated with another transaction from the aggregated set of transaction data using an optical sensor of the hardware device for the user;
extract item-level data for the other transaction from the scanned printed receipt using optical character recognition, the item-level data for the other transaction identifying a plurality of items within the other transaction; and
display identifiers for the plurality of items within the other transaction in response to receiving predefined user input relative to the other transaction in the displayed aggregated set of transactions.

* * * * *